(12) United States Patent
Yasuda

(10) Patent No.: US 8,787,746 B2
(45) Date of Patent: Jul. 22, 2014

(54) IMAGE SHAKE CORRECTING APPARATUS, OPTICAL EQUIPMENT, AND IMAGING DEVICE

(71) Applicant: Canon Kabushiki Kaisha, Tokyo (JP)

(72) Inventor: Hiromu Yasuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/055,235

(22) Filed: Oct. 16, 2013

(65) Prior Publication Data

US 2014/0119717 A1 May 1, 2014

(30) Foreign Application Priority Data

Oct. 30, 2012 (JP) ................. 2012-239218

(51) Int. Cl.
*G03B 17/00* (2006.01)
(52) U.S. Cl.
USPC ........................................................ 396/55
(58) Field of Classification Search
USPC ........................................................ 396/55
See application file for complete search history.

(56) References Cited

U.S. PATENT DOCUMENTS

| 5,020,369 | A | * | 6/1991 | Washisu et al. | 73/514.02 |
| 5,305,040 | A | * | 4/1994 | Enomoto | 396/55 |
| 6,101,033 | A | * | 8/2000 | Kuno et al. | 359/557 |
| 7,783,179 | B2 | * | 8/2010 | Takahashi | 396/55 |
| 8,139,291 | B2 | * | 3/2012 | Nakamura et al. | 359/557 |

FOREIGN PATENT DOCUMENTS

JP   2008-134329 A   6/2008

* cited by examiner

*Primary Examiner* — W B Perkey
(74) *Attorney, Agent, or Firm* — Cowan, Liebowitz & Latman, P.C.

(57) ABSTRACT

An image shake correcting apparatus includes a movable member configured to hold an image shake correcting member; a fixed member configured to hold the movable member so as to be movable along a spherical surface centering on a rotational center point; and an electromagnetic drive unit configured to have a magnet and a coil provided in portions that are mutually opposed in the movable member and the fixed member, wherein the magnet and the coil are disposed with inclination from a direction perpendicular to an optical axis so that a direction of drive force that is generated when the coil is energized approximately conforms to a tangential direction of a spherical surface centering on the rotational center point.

20 Claims, 20 Drawing Sheets

IMAGE SHAKE CORRECTING APPARATUS, OPTICAL EQUIPMENT, AND IMAGING DEVICE

BACKGROUND OF THE INVENTION

1. Field of the Invention

The present invention relates to an image shake correcting apparatus incorporated into imaging devices such as digital cameras, or optical equipment such as interchangeable lenses for digital single-lens reflex, binoculars, telescopes, and the like.

2. Description of the Related Art

An image shake correcting apparatus incorporated into digital cameras and the like alleviates the effects from camera shake that occurs during photography by driving an image shake correcting unit that holds an optical member or an imaging element in two directions (a yaw direction and a pitch direction) on a plane perpendicular to an optical axis. The image shake correcting apparatus disclosed in Japanese Patent Laid-Open No. 2008-134329 prevents declines in optical performance when a correcting lens is moved by driving an image shake correcting unit that holds the correcting lens in two directions on a spherical surface centered on a prescribed point.

Japanese Patent Laid-Open No. 2008-134329 discloses a device which drives the image shake correcting unit using voice coil motors. Two voice coil motors are disposed so that drive force is exerted in a first direction and a second direction that are mutually perpendicular and that are perpendicular to an optical axis, thereby achieving a configuration in which the image shake correcting unit is driven in two directions on a spherical surface.

With the device of the above Japanese Patent Laid-Open No. 2008-134329, when the image shake correcting unit is at one end or at the other end of a region of mobility, the distance between a magnet and a coil configuring the voice coil motor significantly changes. As the output of the voice coil motor is strongly dependent on the distance between the magnet and the coil, the output of the voice coil motor also significantly changes according to the position of the image shake correcting unit. Accordingly, in order to extract sufficient drive force even when output is lowest, there is a concomitant enlargement of the voice coil motor.

SUMMARY OF THE INVENTION

The present invention provides an image shake correcting apparatus that reduces output fluctuations in propulsive force, and inhibits lowering of drive efficiency by moving a movable member that holds a correcting member.

According to an aspect of the present invention, an image shake correcting apparatus is provided that includes a movable member configured to hold an image shake correcting member; a fixed member configured to hold the movable member so as to be movable along a spherical surface centering on a rotational center point; and an electromagnetic drive unit configured to have a magnet and a coil provided in portions that are mutually opposed in the movable member and the fixed member. The magnet and the coil are disposed with inclination from a direction perpendicular to an optical axis so that a direction of drive force that is generated when the coil is energized approximately conforms to a tangential direction of a spherical surface centering on the rotational center point.

The image shake correcting apparatus according to the present invention can reduce output fluctuations in propulsive force, and inhibit lowering of drive efficiency.

Further features of the present invention will become apparent from the following description of exemplary embodiments with reference to the attached drawings.

DESCRIPTION OF THE EMBODIMENTS

Hereinafter, preferred embodiments of the present invention will be described with reference to the drawings. The image shake correcting apparatus of the respective embodiments can be incorporated into optical equipment including photographic devices such as video cameras, and digital and silver-salt still cameras, as well as observation devices such as binoculars, telescopes, and field scopes. For example, the respective embodiments can be applied to an image shake correcting optical system that configures an imaging optical system in an imaging device. A unit which corrects image shake due to vibration such as camera shake using an image shake correcting lens is controlled by a drive controller.

(First Embodiment)

Figure 1:
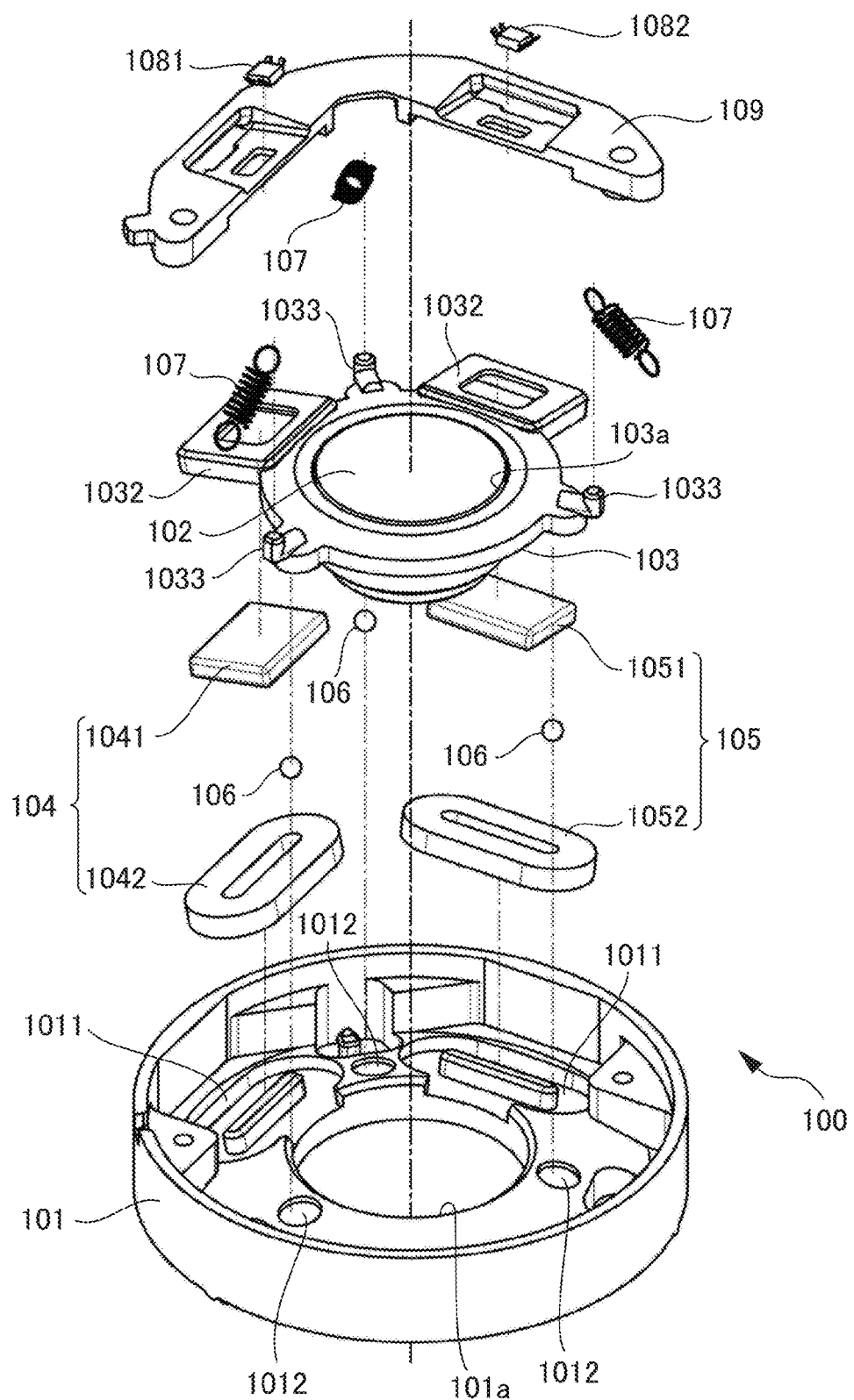
FIG. 1 is an exploded perspective view illustrating an exemplary configuration of an image shake correcting apparatus in order to describe a first embodiment of the present invention using FIG. 1 to FIG. 8 in combination.
Figure 2:
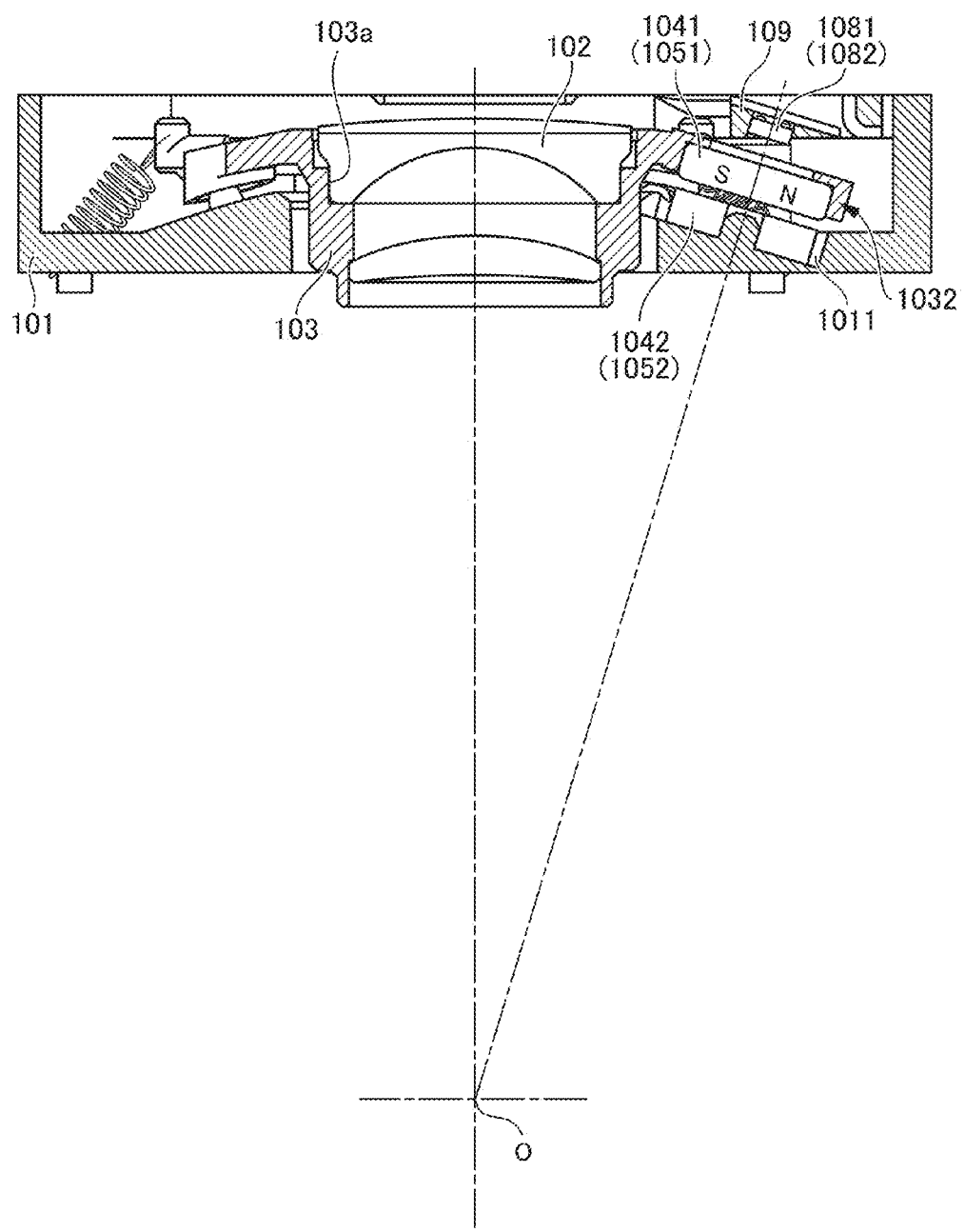
FIG. 2 is a cross-sectional view of the case where the image shake correcting apparatus is cut in a plane that parallels a yaw direction through a rotational center point O.
Figure 3:
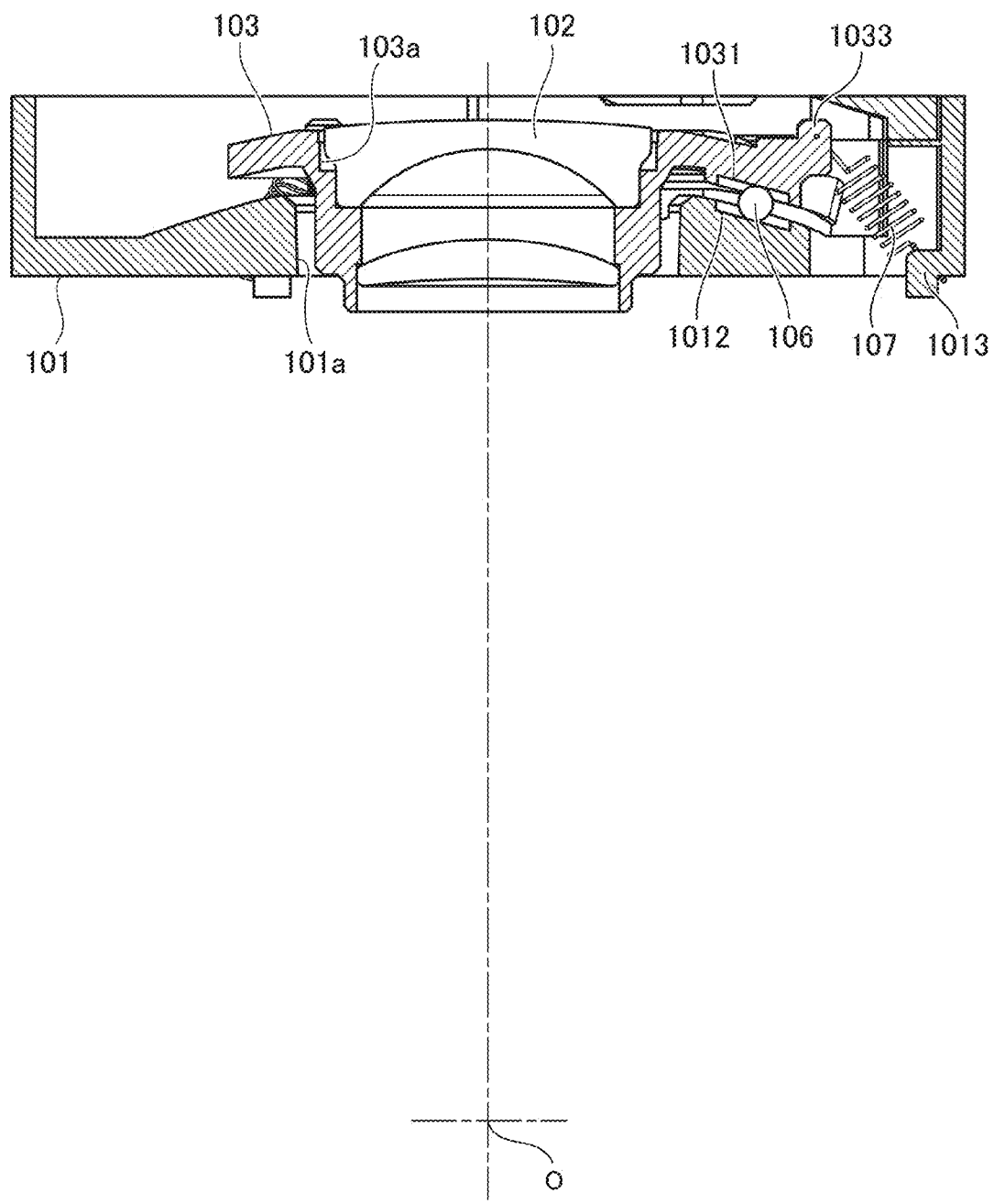
FIG. 3 is a cross-sectional view of the case where the image shake correcting apparatus is cut in a plane that passes through an optical axis the center of a rolling member.

An image shake correcting apparatus pertaining to a first embodiment of the present invention is described with reference to FIGS. 1 to 8. FIGS. 1 to 3 are diagrams illustrating an exemplary configuration of an image shake correcting apparatus. FIG. 1 is an exploded perspective view illustrating a component structure of an image shake correcting apparatus 100. FIG. 2 is a cross-sectional view of the case where the image shake correcting apparatus 100 after assembly is cut in a plane that passes through a rotational center point O and that parallels a first direction (yaw direction). FIG. 3 is a cross-sectional view of the case where the image shake correcting apparatus 100 after assembly is cut in a plane that passes through the rotational center point O, and that passes through the center of a rolling member (in this embodiment, a ball) 106.

The image shake correcting apparatus 100 has a fixed member 101, and an image shake correcting unit 103 that holds a correcting lens 102. The image shake correcting unit 103 is supported in a movable state in the fixed member 101 using rolling members 106 and tension springs 107, and is a movable member that is driven using a first electromagnetic drive unit 104 and a second electromagnetic drive unit 105. The first and second electromagnetic drive units are each provided with a permanent magnet and an electromagnetic coil. A first position sensor 1081 and a second position sensor 1082 are provided in a sensor holder 109 for purposes of detecting a position of the image shake correcting unit 103.

The details of the respective components are described below. The fixed member 101 is formed in a cylindrical shape with a bottom, and is held by a lens barrel that fixes the lens of the imaging optical system. In an aperture 101a formed at the center of the fixed member 101, the image shake correcting unit 103 is disposed with a limited movable range. In addition, the fixed member 101 has coil holders 1011 in two places at the periphery of the aperture 101a. The details of the coil holders 1011 are described below. A plurality of fixed-side ball receivers 1012 are provided at the periphery of the aperture 101a. The number of fixed-side ball receivers 1012 is equal to the number of rolling members 106, and three are disposed at equal angles and intervals around the central axis of the aperture 101a in the present embodiment. As shown in FIG. 3, a bottom surface of the fixed-side ball receiver 1012 is formed to constitute part of a spherical surface centering on a rotational center point O located on the optical axis of the correcting lens 102. An inner surface of the fixed-side ball receiver 1012 constitutes a wall surface that regulates the range of mobility of the rolling member 106, and prevents dislocation of the rolling member 106. The fixed member 101 also has spring attachment parts 1013 at multiple sites, to which one end of a tension spring 107 is respectively attached. In the present embodiment, the number of tension springs 107 is three.

The correcting lens 102 is held in the image shake correcting unit 103, and moves together with the image shake correcting unit 103 along a spherical surface centering on the rotational center point O. The image shake correcting apparatus moves an image produced by an imaging optical system in a plane perpendicular to the optical axis, and can ensure stability of the image plane in the case where camera shake or the like is detected. Otherwise, a rotational direction (second direction) centering on a rotational axis perpendicular to the optical axis of the imaging optical system is defined as the pitch direction, and a rotational direction centering on a rotational axis perpendicular to the pitch direction is defined as the yaw direction. In addition to embodiments employing a correcting lens as the correcting optical component (correcting member), it is also possible to have embodiments in which imaging elements or prisms are driven.

The image shake correcting unit 103 is a movable member which holds the correcting lens 102 in a central aperture 103a, and has movable-side ball receivers 1031 at three sites. As shown in FIG. 3, a bottom surface of the movable-side ball receiver 1031 is formed to constitute part of a spherical surface centering on the rotational center point O located on the optical axis of the correcting lens 102. The radius of this spherical surface is equal to a value obtained by adding the diameter of the rolling member 106 to the radius of the spherical surface of the fixed-side ball receiver 1021. The image shake correcting unit 103 also has magnet holders 1032 at two sites on its peripheral edge (see FIG. 2), and holds below-described first and second permanent magnets (hereinafter simply referred to as "magnets"). The image shake correcting unit 103 has spring attachment parts 1033 at three sites, to which one end of a tension spring 107 is respectively attached.

The first electromagnetic drive unit 104 (a first actuator) is a voice coil motor. A first magnet 1041 is a magnet configured roughly in the shape of a rectangular parallelepiped. In the present embodiment, the surface opposing a first electromagnetic coil 1042 is not particularly a spherical surface centering on the rotational center point O, but is a plane of rectangular oblong shape. The first magnet 1041 is divided in two at the center, respectively having an N pole and an S pole, and magnetization is conducted so that a normal line direction of the opposed surface is the direction of the magnetic pole. With respect to the surface of the opposite side, magnetization may be conducted at the opposite pole from that of the surface opposing the first electromagnetic coil 1042, and magnetization does not have to be conducted when the magnet thickness is sufficiently thick.

The first electromagnetic coil (hereinafter referred to simply as "coil") 1042 is a wound coil formed in an oval shape (its long side is a flat ellipsoid), and one surface thereof opposes the magnetized surface of the first magnet 1041. The surface area opposing the magnetized surface consists of two rectilinear parts that respectively oppose the N pole and S pole of the first magnet 1041, and two arc-shaped parts that link the two rectilinear parts. In this instance, the first magnet 1041 and the first coil 1042 are disposed with inclination relative to the optical axis so that the direction of drive force approximately conforms to a tangential direction of the spherical surface centering on the rotational center point O. When the first coil 1042 is energized by a drive controller (not illustrated in the drawings), Lorentz force is generated in a direction perpendicular to the magnetization direction and energization direction of the first magnet 1041, i.e., in the tangential direction of the spherical surface centering on the rotational center point O. Otherwise, in the present embodiment, the direction of the drive force generated by the first magnet 1041 and the first coil 1042 is considered as the yaw direction. Even when the image shake correcting unit 103 moves on the spherical surface centering on the rotational center point O, the magnetization direction of the first magnet 1041 is always oriented toward the rotational center point O. Consequently, the drive force direction of the first actuator always approximately conforms to the tangential direction of the spherical surface centering on the rotational center point O. The output of the first electromagnetic drive unit 104 increases as the area of opposition of the first magnet 1041 and the first coil 1042 increases. Accordingly, a prescribed area of opposition is required in order to obtain a prescribed output within a predetermined voltage.

The second electromagnetic drive unit 105 (second actuator) is a voice coil motor, and is configured from a second magnet 1051 and a second coil 1052. As it has the same configuration as the first electromagnetic drive unit 104, detailed description thereof is omitted. In this instance, the second magnet 1051 and the second coil 1052 are also disposed with inclination relative to the optical axis so that the direction of drive force approximately conforms to the tangential direction of the spherical surface centering on the rotational center point O. When the second coil 1052 is energized by the drive controller (not illustrated in the drawings), Lorentz force is generated in a direction perpendicular to the magnetization direction and energization direction of the second magnet 1051, i.e., in the tangential direction of the spherical surface centering on the rotational center point O. Otherwise, in the present embodiment, the direction of the drive force generated by the second magnet 1051 and the second coil 1052 is considered as the pitch direction. Even when the image shake correcting unit 103 moves on the spherical surface centering on the rotational center point O, the magnetization direction of the second magnet 1051 is always oriented toward the rotational center point O. Consequently, the drive force direction of the second actuator always approximately conforms to the tangential direction of the spherical surface centering on the rotational center point O. As the first electromagnetic drive unit 104 and the second electromagnetic drive unit 105 are disposed on the outer periphery of the correcting lens 102, the portion of the image shake correcting unit 103 on the inner periphery side can be used for the optical path of the correcting lens 102.

The rolling member 106 is a ball member which conducts rolling support of the image shake correcting unit 103 on the fixed member 101. In the present embodiment, the number of rolling members 106 is three, and they are uniformly disposed in a circumferential direction centering on the optical axis. As the rolling member 106 has little rolling resistance, and is fabricated to a high degree of machining accuracy, it is formed with material that is high in hardness such as stainless steel or ceramic material. Otherwise, instead of the rolling members 106, it would also be acceptable to use spindle-shaped members that are arranged so as to project from the fixed member 101, and that support the image shake correcting unit 103 by point contact at the distal end. The tension springs 107 are disposed between the fixed member 101 and the image shake correcting unit 103, and exert energizing force in the direction that brings the fixed member 101 and the image shake correcting unit 103 together. By this means, the rolling members 106 can be held between the fixed member 101 and the image shake correcting unit 103. In the present embodiment, three springs are disposed at equal intervals in the circumferential direction. By means of these tension springs 107, tensile force is also generated in the radial direction centering on the correcting lens 102. In the present embodiment, three springs are used, but it is also acceptable use a magnet to exert biasing force in the direction that brings together the fixed member 101 and the image shake correcting unit 103.

The sensor holder 109 is a member which holds the first position sensor 1081 and the second position sensor 1082, and is fixed to the fixed member 101. The first position sensor 1081 is a magnetic detection unit which detects movement of the image shake correcting unit 103 in the yaw direction. In the present embodiment, a sensor is used that detects changes in magnetic flux density by a hole element or the like, and is disposed opposite the first magnet 1041. By detecting magnetic flux density that varies according to movement of the first magnet 1041 fixed to the image shake correcting unit 103, it is possible to detect movement of the image shake correcting unit 103 in the yaw direction. This position detection signal is output to the drive controller (not illustrated in the drawings), where feedback control of the image shake correcting unit 103 is conducted, and highly accurate position control is implemented. The second position sensor 1082 detects movement of the image shake correcting unit 103 in the pitch direction. As it has the same configuration as the first position sensor 101 except for its disposition and direction of detection, detailed description thereof is omitted.

Next, the structure and operations of the image shake correcting apparatus 100 are described with reference to FIGS. 2 and 3. First, the relationship between the fixed member 101 and the image shake correcting unit 103 is described. In the present embodiment, the three rolling members 106 are disposed so that each one contacts the bottom surface of a fixed-side ball receiver 1012 provided in the fixed member 101. The respective rolling members 106 also contact the movable-side ball receivers 1031 provided in the image shake correcting unit 103. In this state, tensile force is exerted between the fixed member 101 and the image shake correcting unit 103 by the tension springs 107. By means of this tensile force, the rolling members 106 stably conduct rolling support of the image shake correcting unit 103 in a state of interposition between the fixed member 101 and the image shake correcting unit 103.

The contact surfaces where the rolling members 106 are respectively subjected to point contact by the movable-side ball receiver 1031 and the fixed-side ball receiver 1012 constitute part of concentric spherical surfaces centering on the rotational center point O. The radial difference of these spherical surface counterparts is equal to the diameter of the rolling member 106. Accordingly, regardless of the position of the image shake correcting unit 103 or the rolling member 106, the fixed-side ball receiver 1012 and the movable-side ball receiver 1031 are maintained in a concentric state. That is, the image shake correcting unit 103 is supported so that it is capable of movement along a spherical surface centered on the rotational center point O. As the three tensile springs 107 respectively generate biasing force that attracts the image shake correcting unit 103 in the direction around the optical axis, even when the image shake correcting unit 103 is moved in a rotational direction centering on the optical axis, a restoring force operates to return it. By this means, a stable position is obtained where the amount of movement in the rotational direction by the image shake correcting unit 103 is zero.

Next, the positional relationship between the first magnet 1041 and the first coil 1042 is described. FIG. 2 is a cross-sectional view of the case where a cut is made in a plane that passes through the optical axis and the center point of the coil. Here, the center point of the coil is the geometric center (hereinafter referred to as "centroid") of the opposed surface of the first coil 1042 that faces the first magnet 1041. In FIG. 2, the foot of a perpendicular that descends from the rotational center point O to the first coil 1042 is disposed so as to coincide with the center point of the pertinent coil. The coil holder 1011 has a form that enables disposition of the first coil 1042 with inclination relative to the optical axis. Moreover, the foot of a perpendicular that descends from the rotational center point O to the first magnet 1041 also coincides with the centroid of the opposed surface of the first magnet 1041 that faces the first coil 1042. As the first magnet 1041 is magnetized in a direction perpendicular to the opposed surface that faces the first coil 1042, the magnetization direction is always oriented toward the rotational center point O even in the case where the image shake correcting unit 103 is moved on the spherical surface centering on the rotational center point O. The state where the image shake correcting unit 103 is positioned at the center of its movable range is hereinafter referred to as the "initial state." In the initial state, the opposed surface of the first magnet 1041 is parallel to the opposed surface of the first coil 1042, and the centroid of the opposed surface of the first magnet 1041 and the centroid of the opposed surface of the first coil 1042 are disposed on a straight line that passes through the rotational center point O.

The first magnet 1041 and the first coil 1042 are disposed with inclination relative to the optical axis so that the direction of drive force approximately conforms to the tangential direction of the spherical surface centering on the rotational center point O. Consequently, in the first coil 1042, the drive controller (not illustrated in the drawings) causes current to flow in a direction perpendicular to the surface of the page of FIG. 2, and Lorentz force is therefore exerted within the plane of FIG. 2. The magnetization direction of the first magnet 1041 is oriented in the direction of the rotational center point O as described above. Therefore, when the first coil 1042 is energized, Lorentz is exerted in the image shake correcting unit 103 along the tangential direction of the circle centering on the rotational center point O. As the image shake correcting unit 103 is movably supported on the spherical surface centering on the rotational center point O by the above-described mechanism, the image shake correcting unit 103 can be efficiently rotated in the yaw direction centering on the rotational center point O by energization of the first coil 1042.

The second magnet 1051 and the second coil 1052 have a phase that is rotated 90° with the optical axis as the central axis relative to the first magnet 1041 and the first coil 1042, and their mutual positional relationship is identical to that of the first magnet 1041 and the first coil 1042. Consequently, by energizing the second coil 1052, the image shake correcting unit 103 can be efficiently rotated in the pitch direction centering on the rotational center point O. By combined energization of the respective coils, the correcting lens 102 can be moved to any position along the spherical surface centering on the rotational center point O.

Figure 4:
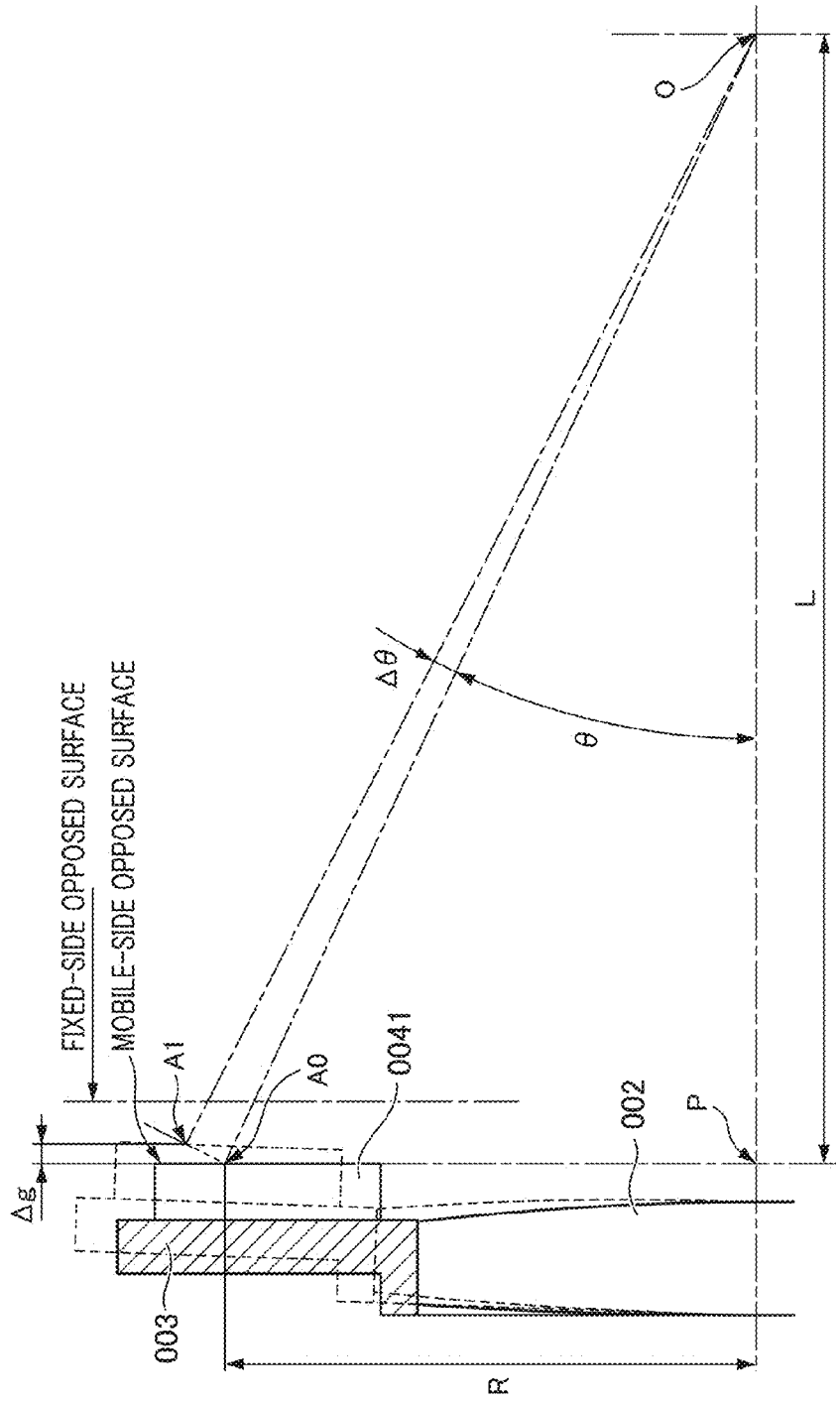
FIG. 4 is a cross-sectional view of the case where an image shake correcting apparatus of a comparative example is cut in a plane that is vertical to a rotational axis of a movable member through the rotational center point O.
Figure 5:
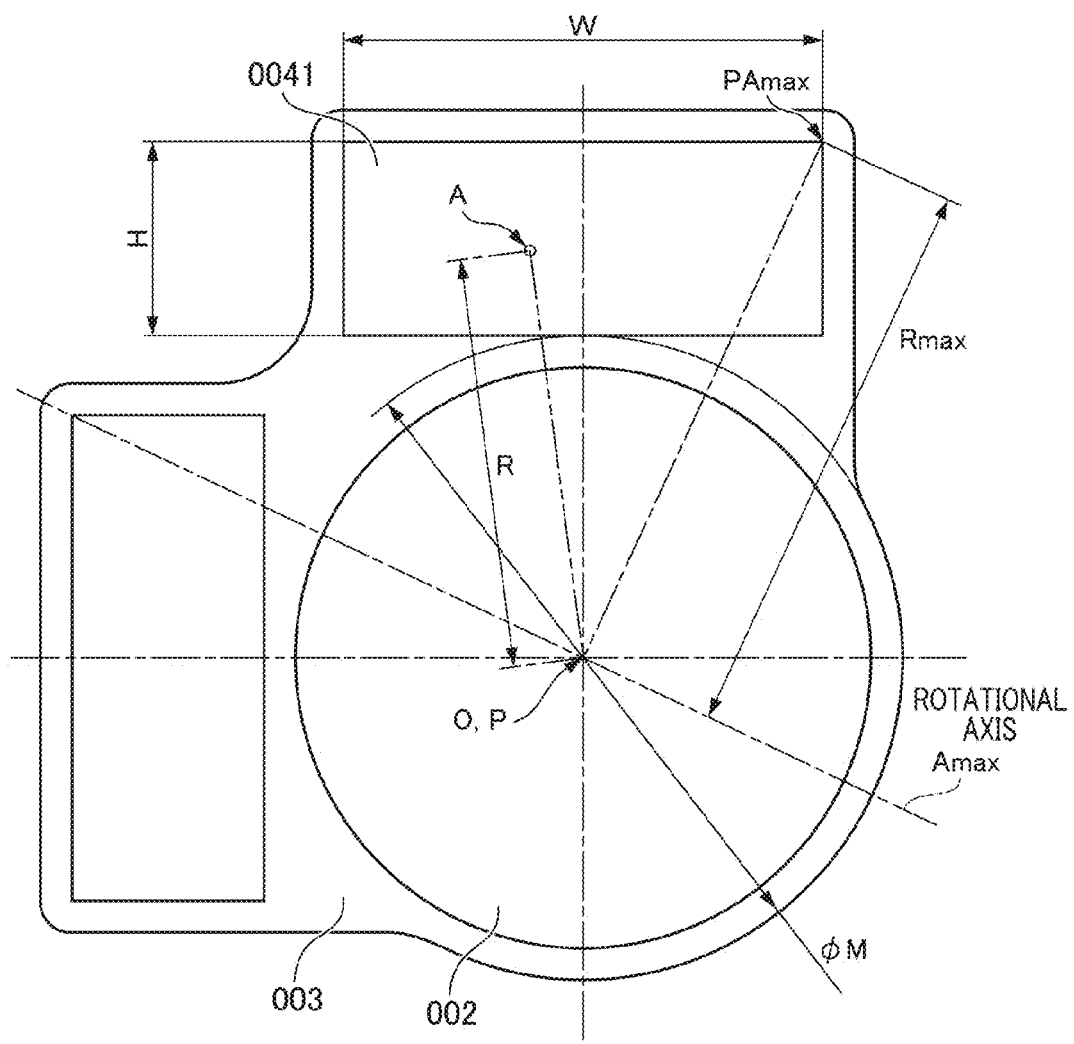
FIG. 5 is a frontal view illustrating a positional relationship of a correcting lens and a magnet that configure the image shake correcting apparatus of FIG. 4.

Next, a description is given concerning gap change amounts of the coil and the magnet, and output variation of the electromagnetic drive unit, using a conventional image shake correcting apparatus as a comparative example in contradistinction to the present embodiment. First, a description is given of gap change amounts and output variation of the electromagnetic drive unit in a conventional image shake correcting apparatus with reference to FIGS. 4 to 6. FIG. 4 is a cross-sectional view of the case where a cut is made in a plane that passes through the optical axis, and that is vertical to the rotational axis of the movable member in a conventional image shake correcting apparatus. FIG. 5 is a frontal view of the conventional image shake correcting apparatus, and shows an opposed surface of a magnet that faces a coil from the optical axis direction. Each drawing respectively shows a correcting lens 002, an image shake correcting unit 003, and a magnet 0041. Reference numbers are shown with replacement of 1 by 0 in the first numeral of the reference numbers used for components of the present embodiment. Otherwise, the image shake correcting apparatuses of the comparative example and the present embodiment have the configuration of a movable magnet system in which magnets are disposed in the image shake correcting unit, and coils are disposed in the fixed member. Of course, it is also possible to have a configuration that is the reverse thereof wherein the coils are disposed in the image shake correcting unit, and the magnets are disposed in the fixed member. With respect to opposed surfaces where a coil and a magnet face each other in the electromagnetic drive unit, a surface where a magnet or a coil is attached to the image shake correcting unit is hereinafter referred to as a "movable-side opposed surface," and a surface where a magnet or a coil is attached to the fixed member is hereinafter referred to as a "fixed-side opposed surface." In cases where there is no particular need to distinguish between the movable side and the fixed side, the term "opposed surface" is simply used.

In the initial state, the magnet 0041 that is attached to the image shake correcting unit 003 is disposed in parallel with a coil attached to the fixed member (not illustrated in the drawing). The normal lines of the fixed-side opposed surface and the movable-side opposed surface shown in FIG. 4 are disposed in parallel with the optical axis of the correcting lens 02. Here, in order to simplify the description, the fixed-side opposed surface is considered as an infinite plane, while the movable-side opposed surface is defined as a plane of limited expanse. Moreover, a foot of a perpendicular that descends from the rotational center point O to the movable-side opposed surface is considered as a point P.

In FIG. 4, the image shake correcting unit 003 in the initial state is shown by a solid line, and the state where the image shake correcting unit 003 is rotated proportionate to Δθ centering on the rotational center point O is shown by broken lines. As a result of this rotation, the gap between the magnet and the coil changes, and the change amount varies according to the size of a distance R from the point P. In this instance, the distance R represents length to a position of a point A0 using the point P as reference. The point A0 is positioned on the movable-side opposed surface in the initial state, and a point after movement is considered as A1. The gap change amount at this time is denoted as Δg. Distance from the point P to a point O is denoted as L, and an angle constituted by a straight line OP and a straight line O-AO is denoted as θ. Formula (1) is established from the geometric relationships shown in FIG. 4.

(Formula 1)

$$\Delta g = \sqrt{R^2 + L^2} \cos(\theta + \Delta\theta) - L \qquad (1)$$

Here, Formula (2) is established.

(Formula 2)

$$\sin\theta = \frac{R}{\sqrt{R^2 + L^2}},\ \cos\theta = \frac{L}{\sqrt{R^2 + L^2}} \quad (2)$$

Consequently, Formula (1) can be rewritten as Formula (3).
(Formula 3)

$$\Delta g = L(\cos\Delta\theta - 1) - R\sin\Delta\theta \quad (3)$$

From Formula (3), it is clear that the absolute value of the gap change amount Δg is maximal (such a value is considered as Δgmax) when the R value is maximal. A negative value of Δg represents that the gap between the magnet and the coil becomes closer when the image shake correcting unit 003 is rotated in the forward direction of FIG. 4. The R value is maximal at a point PAmax that is positioned in a corner on the outer peripheral side of the magnet 0041, when the image shake correcting unit 003 is rotated with a rotational axis Amax shown in FIG. 5 as the central axis.

A description is now given of an example in which the conditions of the below Table 1 are set.

TABLE 1

| Various amounts | Setting values | Unit |
| --- | --- | --- |
| Δθ: rotatable angle of image shake correcting unit 003 | ±2 | degree |
| M: settable radius of correcting lens 002 | 10 | mm |
| W: width of magnet 0041 | 15 | mm |
| H: height of magnet 0041 | 6 | mm |
| L: distance between point P and point O | 30 | mm |

Figure 6:
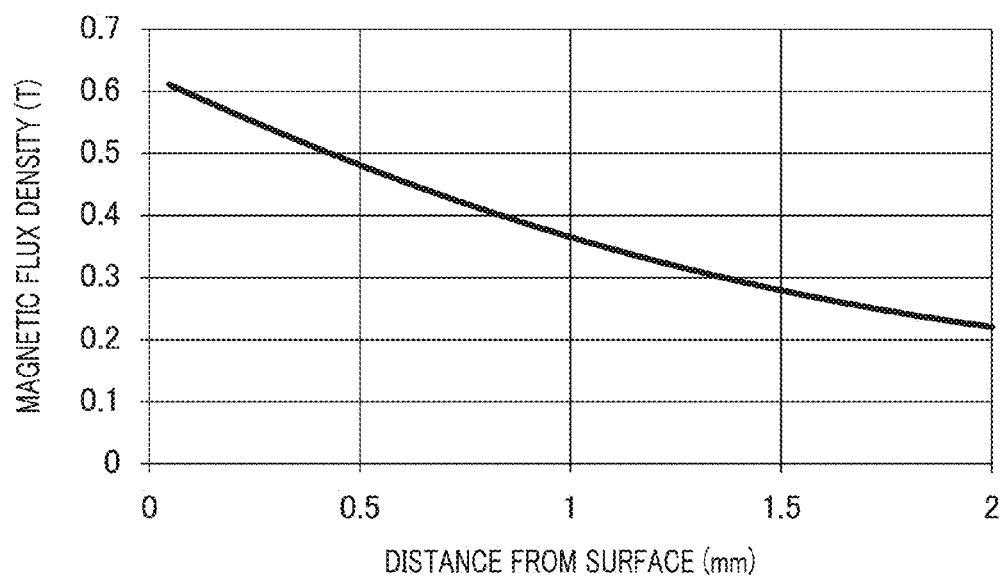
FIG. 6 is a graph illustrating the relationship of magnetic flux density and distance from the magnet.

In this case, as the distance from point P to point PAmax (considered as Rmax; see FIG. 5) is 21.9 mm, the maximum value (considered as Δgmax) of the gap change amount Δg is 0.784 mm according to Formula (3). The gap between the magnet and the coil in the initial state must be set larger than Δgmax, and it is here set to 0.784 mm for purposes of simplifying description. The Lorentz force generated when the coil is energized is proportionate to the intensity of magnetic flux density. In the case where the Lorentz force of the entire actuator is sought, to be accurate, it is necessary to integrate the magnetic flux densities at each point of the coil. In this instance, approximation is conducted with a value obtained by using the magnetic flux density at the centroid of the opposed surface, and an approximate value is used for purposes of simplifying description. Generally, the magnetic flux density of a magnet weakens as distance from the magnet increases. For example, a magnet having the magnetic flux density distribution shown in FIG. 6 is used. The horizontal axis shows distance from the magnet surface (unit: mm), and the vertical axis shows magnetic flux density (unit: T (tesla)).

When a distance from the point P to the centroid of the movable-side opposed surface is considered as R0, as the value of R0 is 13 mm, the change amount when the gap on the centroid is largest (Δg0max) is 0.435 mm, the value obtained when the image shake correcting unit 003 is rotated at an angle of −Δθ. The gap between the magnet 0041 and the coil at this time is Δgmax+Δg0max, i.e., 1.22 mm. Magnetic flux density at this time is 0.32 T according to FIG. 6.

Figure 7:
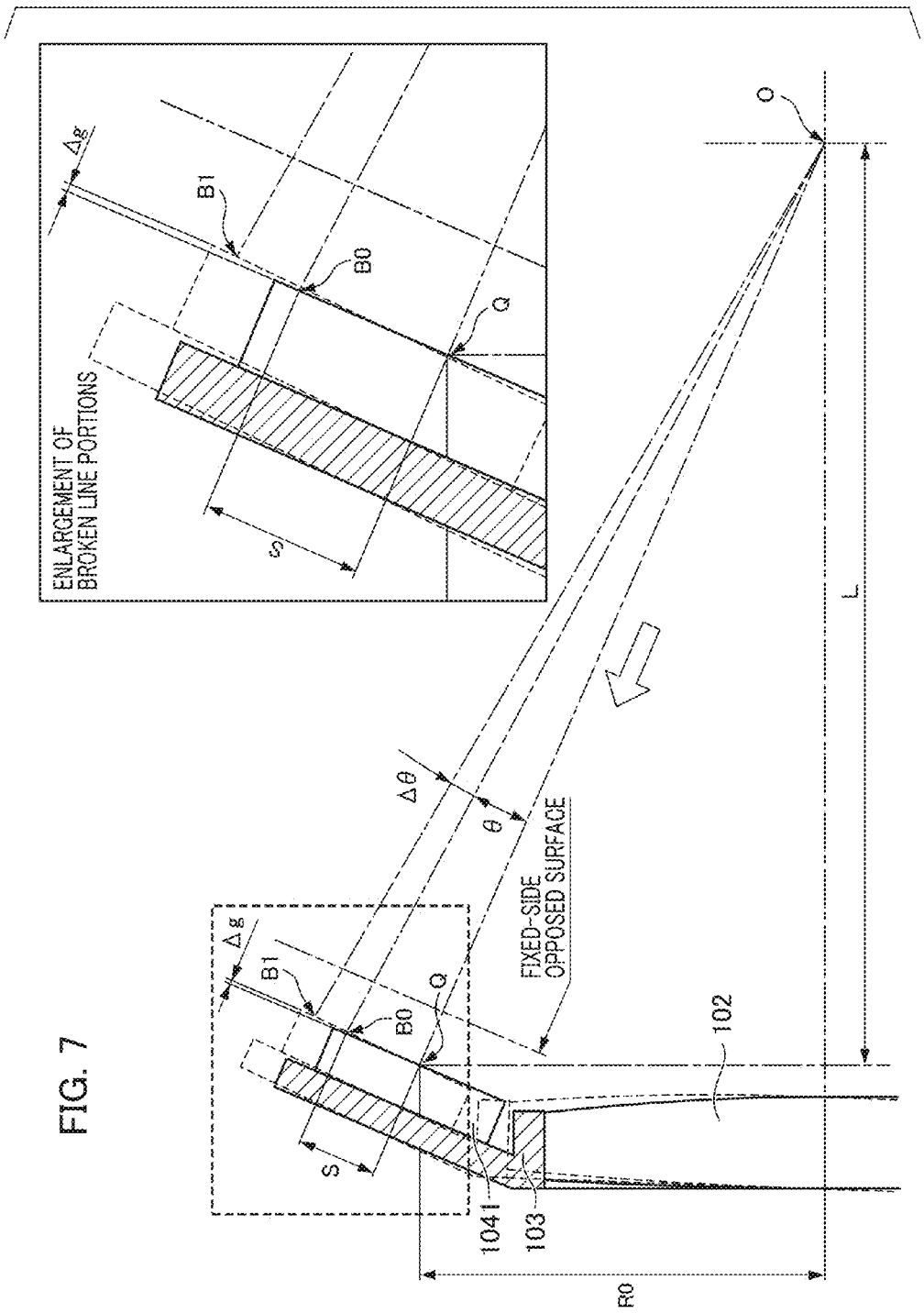
FIG. 7 is a cross-sectional view illustrating a gap change amount of the magnet and a coil in the first embodiment.
Figure 8:
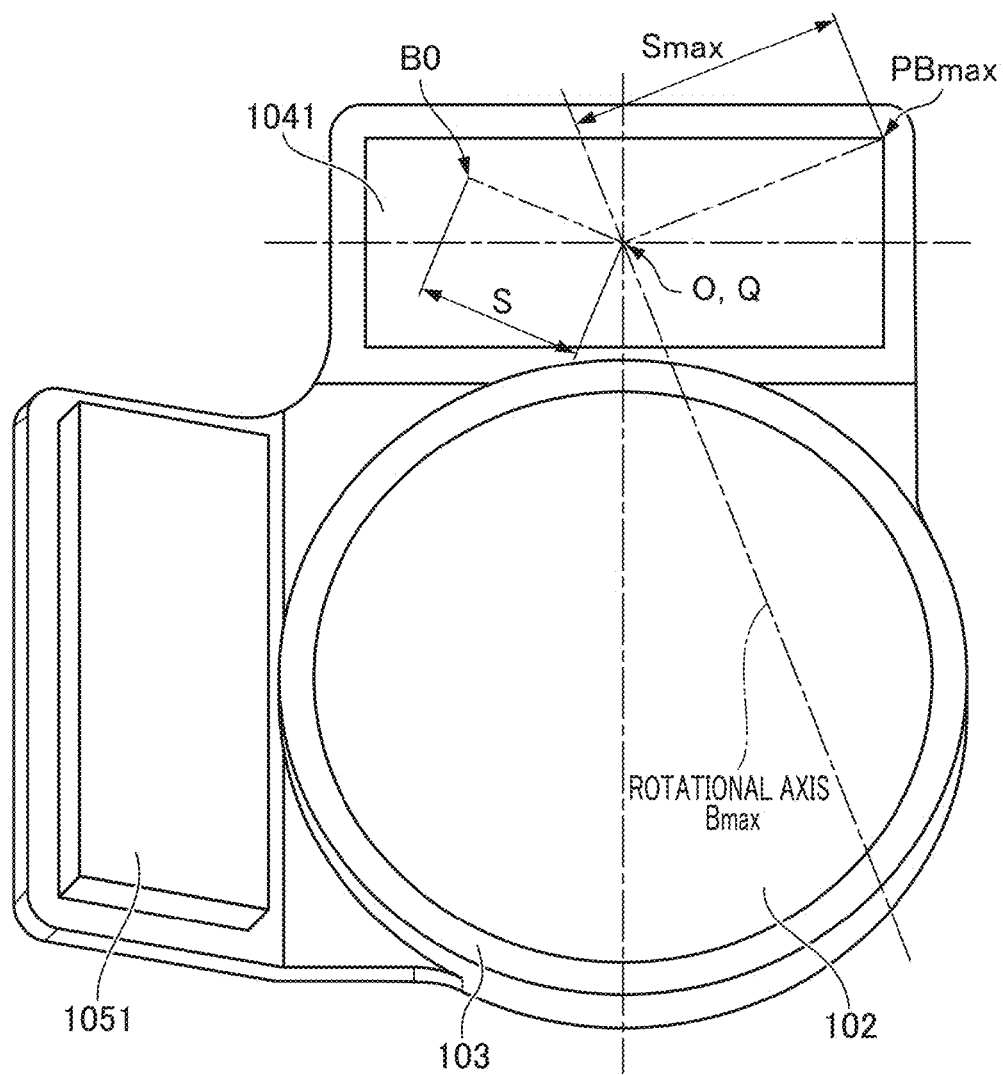
FIG. 8 is a frontal view illustrating a positional relationship of the correcting lens and the magnet that configure the image shake correcting apparatus of FIG. 7.

Next, a description is given of gap change amounts and output variation of the electromagnetic drive unit in the image shake correcting apparatus of the present embodiment with reference to FIGS. 6 to 8. FIG. 7 is a cross-sectional view of the case where the image shake correcting apparatus 100 is cut in a plane including the optical axis and perpendicular to the rotational axis of the image shake correcting unit 103. FIG. 7 corresponds to a drawing that displays the state of FIG. 2 in a simplified manner. FIG. 8 is a frontal view in the case where the image shake correcting apparatus 100 of FIG. 7 is viewed from the normal line direction of the movable-side opposed surface (i.e., the direction viewed from the rotational center point O; see the white arrow mark direction in FIG. 7). A point Q is a foot of a perpendicular that descends from the rotational center point O to the movable-side opposed surface. A distance obtained by projecting the length of line segment OQ in the direction of the optical axis is considered as L, and a distance obtained by projecting in the radial direction perpendicular to the optical axis is considered as R0.

In FIG. 7, the image shake correcting unit 103 in the initial state is shown by a solid line, and the state in which it is rotated proportionate to Δθ centering on the rotational center point O is shown by broken lines. As shown in FIG. 8, the point Q is superimposed on the centroid of the magnet 1041 in the present embodiment. The gap between the magnet 1041 and the coil 1042 changes according to movement of the image shake correcting unit 103, and the change amount varies according to the size of a distance (denoted by "S") from the point Q to a point B0. The point B0 represents an optional position on the movable-side opposed surface. Point B1 indicates a position in the case where point B0 is rotated proportionate to Δθ. The angle of <QOB0 is considered as θ, and the angle of <QOB1 as Δθ. When calculations are conducted in the same manner as Formulas (1) to (3) with respect to the gap change amount Δg at point B0 located at distance S from point Q on the movable-side opposed surface, Formula (4) is obtained.

(Formula 4)

$$\Delta g = \sqrt{R0^2 + S^2 + L^2}\cos(\theta + \Delta\theta) - \sqrt{R0^2 + L^2} \quad (4)$$
$$= \sqrt{R0^2 + L^2}(\cos\Delta\theta - 1) - S\sin\Delta\theta$$

From Formula (4), it is clear that the absolute value of the gap change amount Δg is largest when the absolute value of S is largest. The maximum value of Δg is, for example, point PBmax positioned in the corner of magnet 1041 in the case where the image shake correcting unit 103 is rotated with rotational axis Bmax shown in FIG. 8 as the central axis. As the same conditions as those of the aforementioned Table 1 are all present, the position of the centroid in the magnet conforms to the example shown in FIGS. 4 and 5.

Given that R0=13 mm and Smax=8.07 mm, 0.30 mm is obtained when the maximum value Δgmax of the absolute value of the gap change amount is calculated from Formula (4). As in the above-described example, the gap between the magnet 1041 and the coil 1042 in the initial state is set at 0.30 mm. Moreover, the maximum gap change amount Δg0max of the centroid of the magnet 1041 is −0.02 mm whether the image shake correcting unit 103 is rotated at +Δθ, or whether it is rotated at −Δθ. Accordingly, the distance from the centroid of the magnet 1041 to the coil 1042 is greatest in the initial state, where the distance is 0.30 mm. When FIG. 6 is referenced, magnetic flux density at the centroid at this time is 0.54 T.

According to the present embodiment, the following effects are obtained. The maximum value Δgmax of the gap change amount of the magnet and the coil can be reduced.

Whereas in the above-described comparative example (see FIGS. 4 and 5) Δgmax is 0.784 mm, in the present embodiment, Δgmax is much smaller at 0.30 mm. Consequently, the gap between the magnet and the coil in the initial state can be narrowed, and the efficiency of the electromagnetic unit can be enhanced. In the case where the opposed surfaces of the magnet and the coil are perpendicular to the optical axis, the maximum value of the gap change amount can be made identical to that of the present embodiment by disposing the centroid of the magnet on the optical axis. However, under these circumstances, the optical path of the correcting lens 102 can no longer be assured. In the case where the electromagnetic drive unit is disposed on the outer side of the optical path of the correcting lens 102, the maximum value of the gap change amount can be reduced by establishing settings so that a perpendicular from the centroid of the electromagnetic drive unit passes through the rotational center point O as in the present embodiment.

The value of the maximum gap change amount Δg0max can be reduced. Δg0max is 0.435 mm in the comparative example, whereas Δg0max is −0.02 mm in the present embodiment, which is approximately 1/20 in terms of absolute value. Consequently, it is possible to reduce output variation of the electromagnetic drive unit over the entire range of mobility of the image shake correcting unit 103, and achieve an image shake correcting apparatus of satisfactory controllability. Moreover, as significant reduction in the minimum output of the electromagnetic drive unit can be avoided, there is no need to compensate for insufficient propulsive force by increasing the size of the electromagnetic drive unit, which is conducive to downsizing of the overall device. In the case of the comparative example, when the image shake correcting unit 103 is rotated proportionate to Δθ, the entire area of the movable-side opposed surface is drawn closer to the coil, and when rotated proportionate to Δθ, the entire area is moved away from the coil. In contrast, in the present embodiment, when the image shake correcting unit 103 is rotated proportionate to Δθ, one end of the magnet is drawn closer to the coil, and the other end of the magnet is moved away from the coil. As the two contributing factors offset and cancel out in terms of an average value, the change amount can be reduced compared to before.

Distance when the centroid of the magnet is farthest from the coil can be reduced. This depends on reducing the values of Δgmax and Δg0max. In the comparative example, maximum distance is 1.22 mm, and magnetic flux density is 0.32 T, whereas in the embodiment, maximum distance is 0.30 mm, and magnetic flux density is 0.54 T. Reduction of the magnetic flux density of the magnet surface can be inhibited, and output of the electromagnetic drive unit can be enhanced by 67%. In short, as output of the electromagnetic drive unit is proportional to magnetic flux density, reductions in output of the electromagnetic drive unit can be avoided. Consequently, there is no need to compensate for insufficient propulsive force by increasing the size of the electromagnetic drive unit, which is conducive to downsizing of the overall device.

Manufacture of the magnet and coil configuring the electromagnetic drive unit is facilitated. As the opposed surface of the magnet facing the coil is planar, there is no need to prepare a complex die when manufacturing the magnet, and a general-purpose magnet such as a rectangular parallelepiped magnet can be used. This contributes to reduced cost, and stabilization of quality.

The output of the electromagnetic drive unit can be efficiently used. This is because the drive force of the electromagnetic drive unit always operates in the tangential direction of a circle having the rotational center point O, and conforms to the direction in which the image shake correcting unit is moved. When the individual actuators of the electromagnetic drive unit are observed, the drive force of each actuator also operates in the tangential direction of a circle having the rotational center point O. Each actuator is disposed with inclination relative to the optical axis so that the direction of the respective drive force approximately conforms to the tangential direction of the spherical surface centered on the rotational center point O.

Stable position detection can be conducted. In the initial state, the magnetic detection unit is disposed on a perpendicular that passes through the centroid of the opposed surface of the magnet that faces the coil, and through the rotational center point O. As described above, a relationship wherein the gap change amount of the coil and the magnet can be reduced is also established between the magnet and the magnetic detection unit. That is, the gap change amount of the two can be reduced by disposing the magnet and the magnetic detection unit on the aforementioned perpendicular in the initial state.

Otherwise, in the present embodiment, the magnet and the coil are disposed in parallel opposition in the initial state. Consequently, the maximum gap change amount pertaining to the angle formed by the opposed surfaces of the magnet and the coil can be reduced over the entire range of mobility. In addition, in cases where it is ascertained in advance that a partial region of the range of mobility will be used with high frequency, it is also acceptable to dispose the opposed surfaces of the magnet and the coil with a prescribed inclination in the initial state. In such cases, apart from the initial state, the movable-side opposed surface and the fixed-side opposed surface are in a range where the two are parallel. In addition, in a section including the optical axis of the correcting lens and the centroids of the planar parts of the magnet and the coil disposed on the movable-side opposed surface and the fixed-side opposed surface, the normal lines that pass through the centroids of the planar parts may be positioned in the vicinity of the aforementioned rotational center point O. In this case, "vicinity" signifies that the difference between the rotational center point O and the intersection of the optical axis and the normal line that passes through the centroid of the planar part is within a permissible range that includes a tolerance or the like.

(Second Embodiment)

Next, a second embodiment of the present invention is described with reference to FIGS. 9 and 10. By using the already employed reference numbers for components that are identical to those of the first embodiment, detailed description thereof is omitted, and description is conducted centering on the points of difference with the first embodiment. This manner of abbreviated description is also followed with respect to the other below-described embodiments.

As described above, output variation of the electromagnetic drive unit can be reduced by reducing the value of the maximum gap change amount Δgmax of the coil and the magnet. As shown in Formula (3) and Formula (4), the gap change amount Δg is determined by the values of Δθ, L, R or R0, and S. Among these, the value of Δθ is determined by the amount of shake to be suppressed and the optical design. Distance from the rotational center point O to the movable-side opposed surface is approximately equal to distance from the rotational center point O to the correcting lens 102. By such means, separation of the correcting lens 102 and the electromagnetic drive unit in the optical axis direction, and increased thickness of the overall device are prevented. Accordingly, using the foot of the perpendicular that descends from the rotational center point O to the movable-side opposed surface as reference, the maximum gap change amount of the coil and the magnet is reduced by reducing the value of maximum distance of the movable-side opposed surface (see Rmax in FIG. 5 and Smax in FIG. 8). In the first embodiment, the foot of the perpendicular that descends from the rotational center point O to the movable-side opposed surface is disposed to conform with the centroid of the movable-side opposed surface. Consequently, as the Smax value is minimized, the gap change amount can be minimized.

In the second embodiment, in contrast to the first embodiment, a form is adopted for the case where the degree of difficulty of machining is reduced, and enlargement of the magnet and the coil is avoided while averting interference with the other parts. FIG. 9 is a perspective view of the case where the image shake correcting apparatus is viewed from the optical axis direction, and shows the position of a foot Q of a perpendicular that descends from the rotational center point O to the movable-side opposed surface. FIG. 10 is a cross-sectional view of the case where the image shake correcting apparatus is cut in a plane including the optical axis and the normal line of the movable-side opposed surface.

Figure 9:
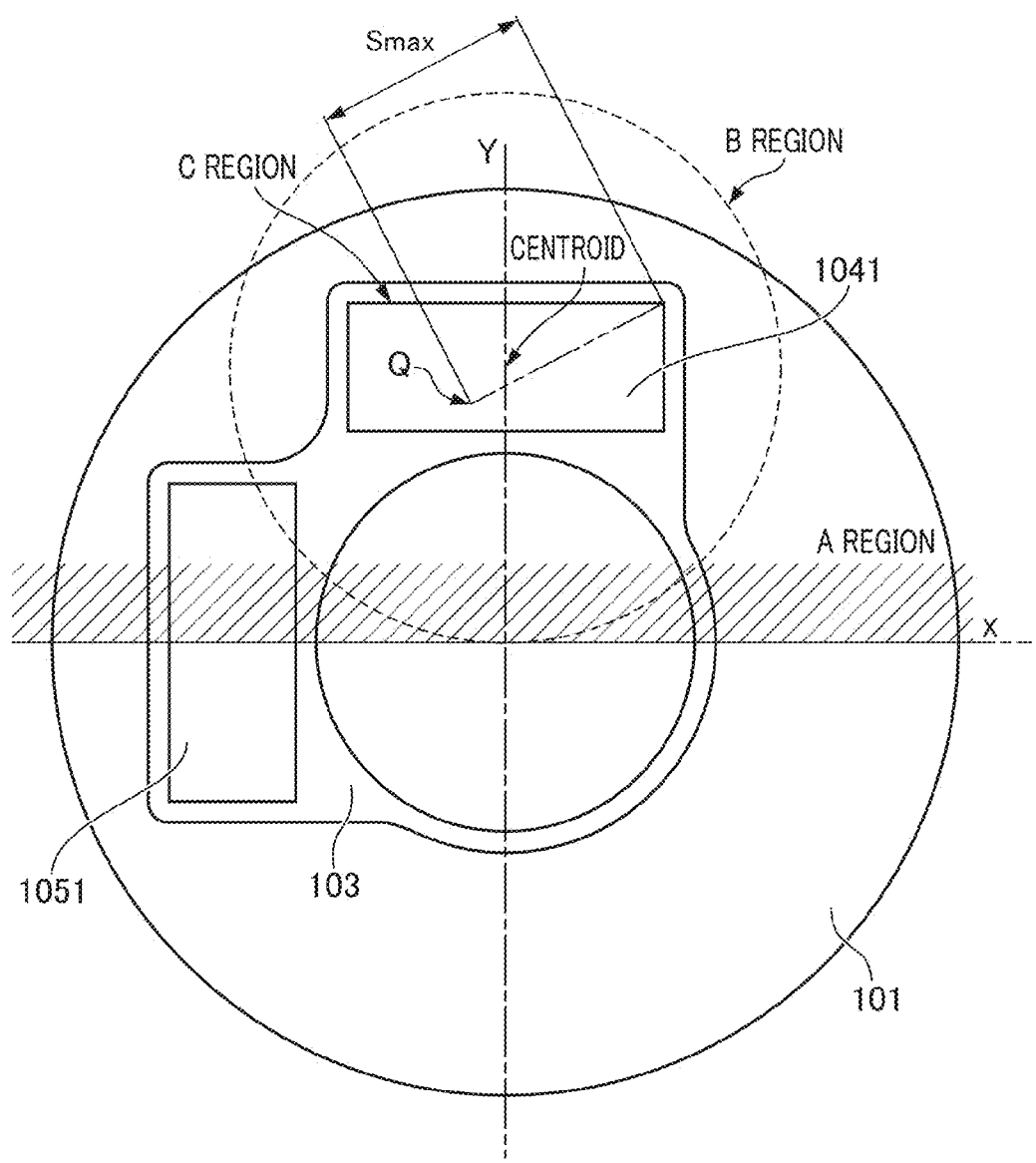
FIG. 9 is a diagram illustrating a position of a foot of a perpendicular that descends from the rotational center point O to a movable-side opposed surface in an image shake correcting apparatus of a second embodiment of the present invention.
Figure 10:
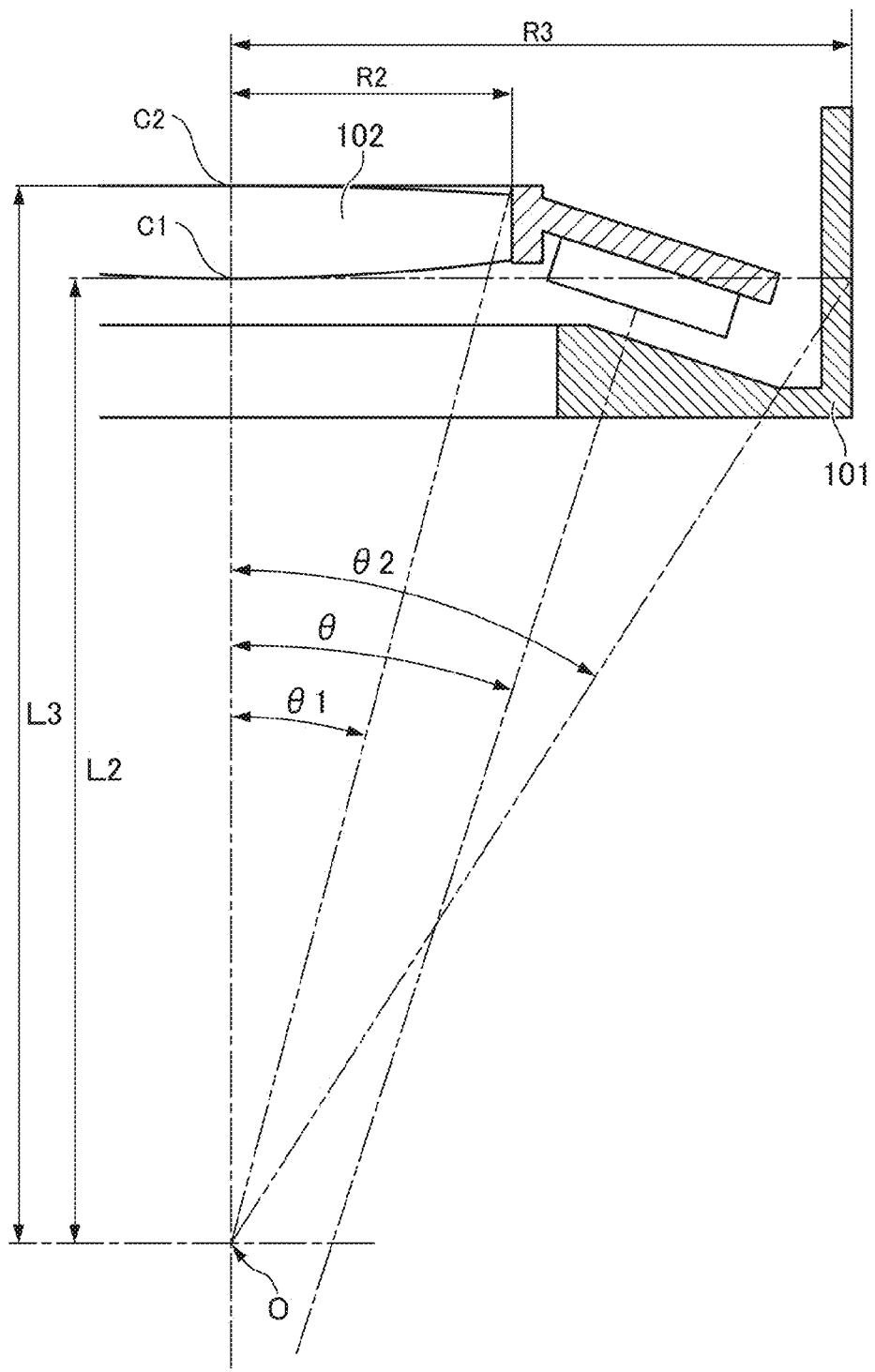
FIG. 10 is a cross-sectional view of the case where the image shake correcting apparatus of the second embodiment of the present invention is cut in a plane including an optical axis and a normal line of a movable-side opposed surface.

First, as shown in FIG. 10, the state is assumed where the movable-side opposed surface is inclined when viewed from the rotational center point O. At this time, the intersection of the optical axis and the perpendicular of the movable-side opposed surface in a plane that passes through the centroid of the movable-side opposed surface is positioned on the same side as the rotational center point O when viewed from the correcting lens 102. However, the two do not always coincide. In the states shown in FIGS. 9 and 10, the foot Q of the perpendicular that descends from the rotational center point O to the movable-side opposed surface does not coincide with the centroid of the movable-side opposed surface, and is positioned in the A region of FIG. 9. In a coordinate system in which 2 axes perpendicular to an optical axis that is vertical on the surface of the page of FIG. 9 are respectively set as the X axis and the Y axis, the A region is the region where Y>O. Using the point Q as reference, the maximum distance Smax in the movable-side opposed plane surface can be made less than Rmax (see FIG. 5). Consequently, the value of the maximum gap change amount Δgmax of the coil and the magnet that configure the electromagnetic drive unit can be reduced, and output variation of the electromagnetic drive unit can be mitigated.

Next, a description is given of the case where the foot Q of the perpendicular that descends from the rotational center point O to the movable-side opposed surface is within a circle shown as B region in FIG. 9. The B region is an internal region of a circle which centers on the centroid of the movable-side opposed surface, and whose radius is the distance from the centroid of the movable-side opposed surface to the optical axis of the correcting lens 102. Within the B region, the maximum distance Smax among the distances from the point Q to the respective points in the movable-side opposed plane surface can be made reliably less than Rmax. Consequently, the value of the maximum gap change amount Δgmax can be reduced, and output variation of the electromagnetic drive unit can be reduced.

Next, a description is given of the case where the foot Q of the perpendicular that descends from the rotational center point O to the movable-side opposed surface is within a rectangular frame shown as C region in FIG. 9. The C region is an internal region with the boundaries of the movable-side opposed surface, and corresponds to the region within the opposed plane surface of the magnet facing the coil in the present embodiment. In the C region, the maximum distance Smax among the distances from the point Q to the respective points in the movable-side opposed plane surface is shorter than the diagonal line length of the rectangular magnet, and is smaller than Rmax. When the image shake correcting unit 103 is rotated in the case where the point Q is disposed in the C region, one end of the magnet is drawn nearer to the coil, and the other end of the magnet is moved away from the coil. Accordingly, the average gap change amount of the magnet and the coil can be greatly reduced, because a mutual cancellation of the two contributing factors occurs in terms of average value.

As described above, the conditions for reducing the value of the maximum gap change amount Δgmax with respect to the aforementioned comparative example correspond to reduction of the ratio of Smax to Rmax as the foot Q of the aforementioned perpendicular is limited to the A region, B region, and C region interiors.

Next, the range of the angle θ constituted by the optical axis and the normal line of the movable-side opposed surface is described with reference to FIG. 10. Among the intersections of the correcting lens 102 and the optical axis in FIG. 10, the one nearer to the rotational center point O is designated as point C1, and the one that is father away is designated as point C2. The distance from the rotational center point O to point C1 is designated as L2, and the distance from the rotational center point O to point C2 is designated as L3. Using the optical axis as reference, the effective radius of the correcting lens 102 is designated as R2, and the radius of the outermost periphery of the fixed member 101 is designated as R3. The angle θ constituted by the optical axis and the normal line of the movable-side opposed surface in the present embodiment satisfies the following formula.

(Formula 5)

$$\theta 1 < \theta < \theta 2 \qquad (5)$$

Here, θ1=Atan (R2/L3), θ2=Atan (R3/L2), and Atan () represents an arctangent function (an inverse function of a tangent). In the case where the angle θ constituted by the optical axis and the normal line of the movable-side opposed surface is within the range shown in Formula (5), the foot Q of the perpendicular that descends from the rotational center point O to the movable-side opposed surface is positioned on the outer peripheral side of the correcting lens 102, and is positioned on the inner side of the outermost periphery of the fixed member 101.

The electromagnetic drive unit of the present embodiment is disposed on the outer peripheral side of the correcting lens 102, more toward the inner side than the outermost periphery of the fixed member 101. Consequently, diametric enlargement of the overall device can be avoided while averting interference with the optical path of the correcting lens 102. That is, location of θ within the range shown in Formula (5) is a condition for positioning the foot Q of the perpendicular that descends from the rotational center point O to the movable-side opposed surface within the electromagnetic drive unit. If within the range shown in Formula (5), the gap change amount of the coil and the magnet can be reduced while disposing the electromagnetic drive unit on the outer side of the optical path of the correcting lens 102.

According to the second embodiment, by fulfilling the conditions described above, the change in distance between the magnet and the coil configuring the electromagnetic drive unit can be reduced, and output variation of the electromagnetic drive unit can be mitigated. Consequently, there is no need to compensate for insufficient propulsive force by enlarging the electromagnetic drive unit, which can contribute to downsizing of the overall device.

(Third Embodiment)

Figure 11:
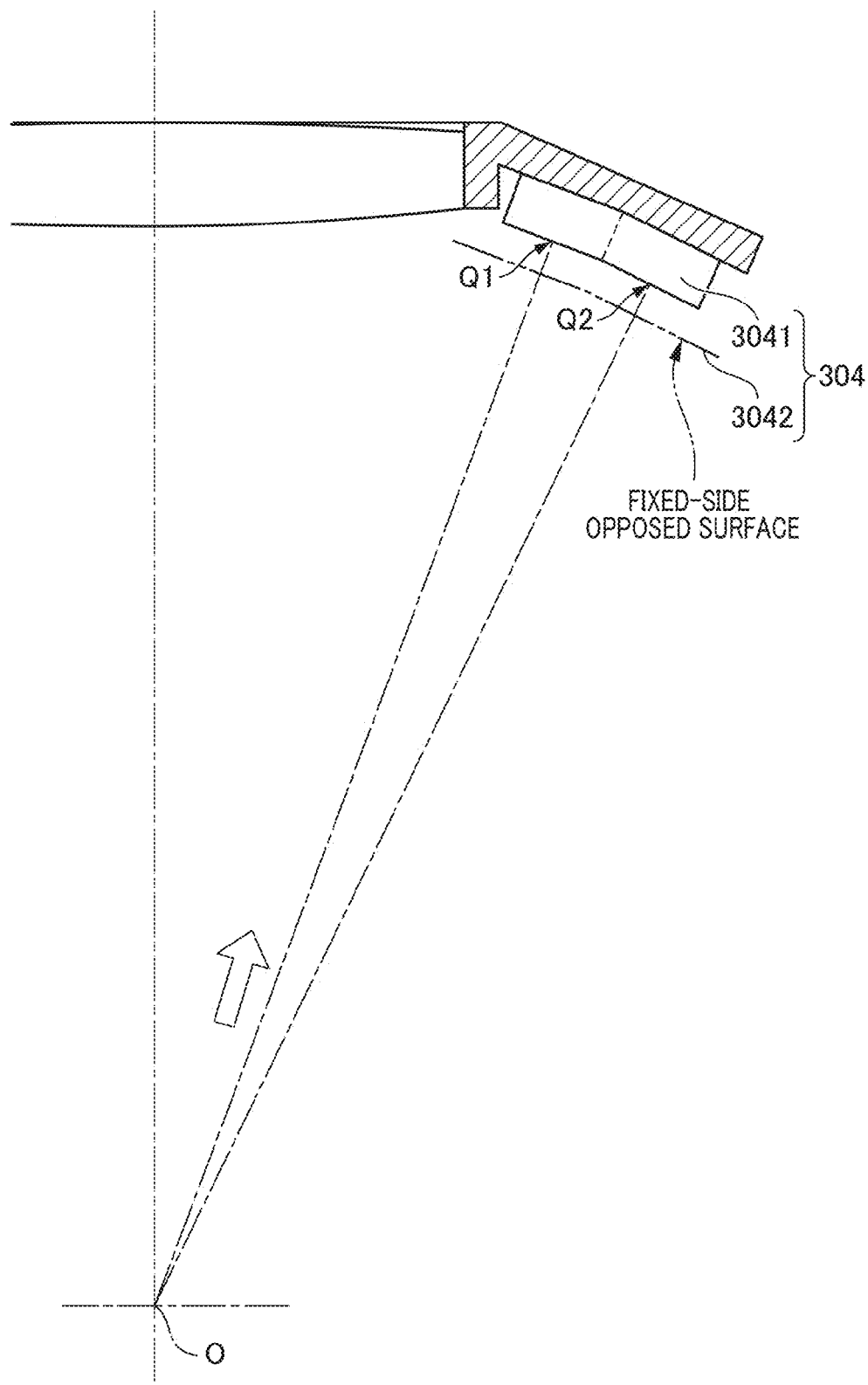
FIG. 11 is a cross-sectional view of the case where an image shake correcting apparatus of a third embodiment of the present invention is cut in a plane that is perpendicular to a rotational axis of the movable member through the rotational center point O.
Figure 12:
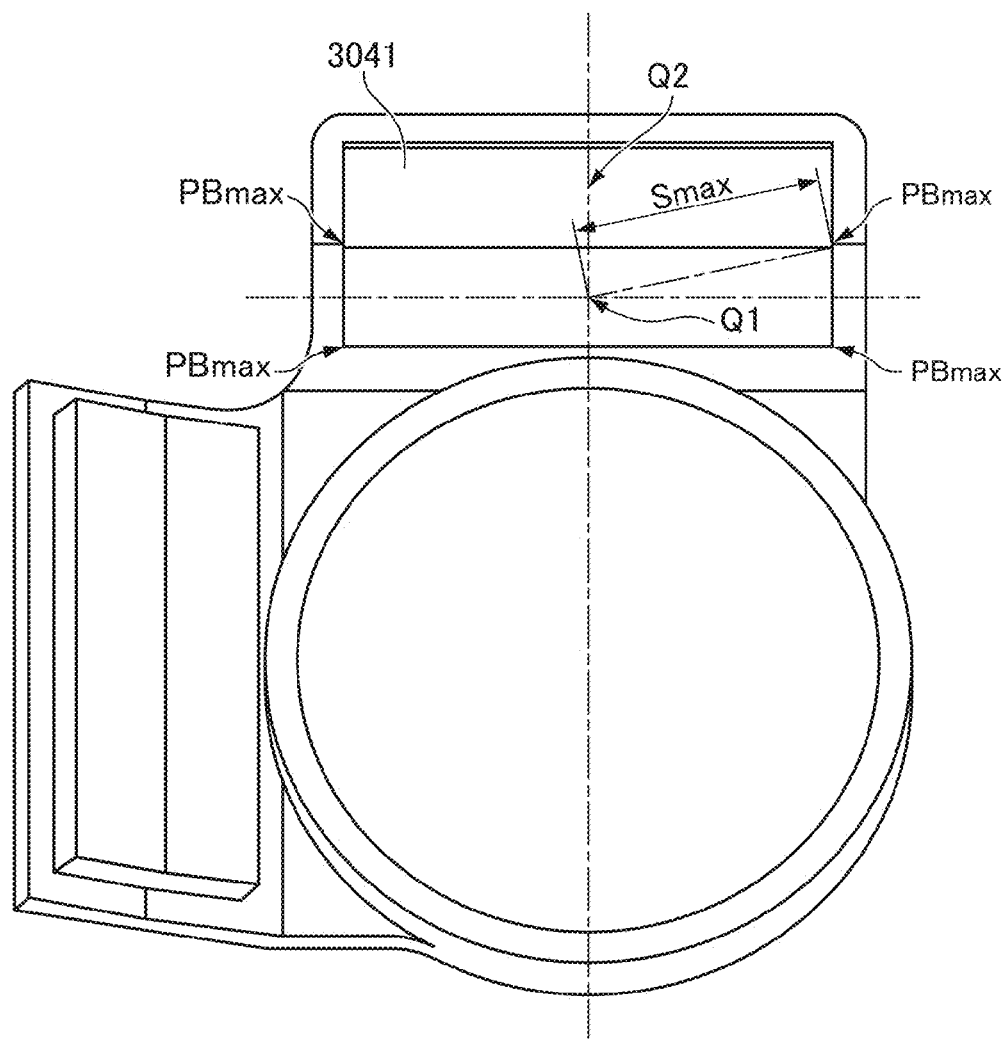
FIG. 12 is a diagram of the case where the image shake correcting apparatus of FIG. 11 is viewed from the normal line direction of the movable-side opposed surface.

Next, a third embodiment of the present invention is described with reference to FIGS. 11 and 12. In the image shake correcting apparatus of the third embodiment, a first drive unit 304 is provided with a first magnet 3041 and a first coil 3042. FIG. 11 is a cross-sectional view of the case where the image shake correcting apparatus of the present embodiment is cut in a plane that passes through the rotational center point O and that is perpendicular to the rotational axis of the image shake correcting unit. FIG. 12 is a drawing of the case where the image shake correcting apparatus of the present embodiment is viewed from the normal line direction of one of the movable-side opposed surfaces (see the straight line OQ1 direction shown by the white arrow mark in FIG. 11).

The first magnet 3041 has two planar parts on the opposed surface facing the first coil 3042. One of the surfaces is designated as the first surface, and the foot of a perpendicular that descends from the rotational center point O to the pertinent surface is designated as point Q1. The other surface is designated as the second surface, and the foot of a perpendicular that descends from the rotational center point O to the pertinent surface is designated as point Q2. In the present embodiment, point Q1 and point Q2 are disposed to respectively coincide with the centroid of the opposed surface. The first coil 3042 has two planar parts on the opposed surface facing the first magnet 3041. A first surface that is one of these opposes the first surface of the first magnet 3041, and a second surface that is the other one opposes the second surface of the first magnet 3041. In a state where a movable member 303 is positioned at the center of a mobility range, the two opposed surfaces (fixed-side opposed surfaces) facing the first magnet 3041 respectively parallel the two opposed surfaces of the movable-side opposed surface. Although description is omitted, the same relationship of movable-side opposed surface and fixed-side opposed surface also exists with respect to a second magnet and a second coil.

In the aforementioned first embodiment and second embodiment, the respective opposed surfaces of the magnet and the coil configuring the electromagnetic drive unit have a single plane, enabling easy manufacture of magnet and coil. In contrast, in the third embodiment, the gap change amount of the magnet and coil can be further reduced by configuring the opposed surfaces of the magnet and coil with multiple surfaces. That is, with a configuration having multiple planar parts on the opposed surfaces of the magnet and coil, the area of each part is smaller than in the case of configuration with a single plane. Accordingly, for example, the maximum distance Smax from point Q1 to a point in the movable-side opposed surface is a smaller value than in the case where the opposed surface were configured with a single plane, reducing the maximum gap change amount Δgmax. Consequently, output variation of the electromagnetic drive unit can be mitigated.

In the present embodiment, there is a configuration wherein point Q1 and point Q2 coincide with the centroid of the respective opposed surface. Consequently, the effect is obtained that the gap change amount of the magnet and the coil can be minimized. Otherwise, by establishing the relationships of the respective opposed surfaces with the foots Q1 and Q2 and the rotational center point O according to the conditions described in the aforementioned second embodiment taking into consideration the degree of difficulty of machining and the like, the same effects as those described above can be obtained. Moreover, with respect to the opposed surface of the magnet facing the coil, it is acceptable to have a form where multiple opposed surfaces are imparted to a single magnet, or where multiple opposed surfaces are configured by combining multiple magnets. A configuration is also acceptable wherein the movable-side opposed surface and the fixed-side opposed surface have three or more planar parts.

(Fourth Embodiment)

A fourth embodiment of the present invention is described with reference to FIGS. 13 to 15. With respect to an image shake correcting apparatus 400 of the present embodiment, a description is given below of a first electromagnetic drive unit 404 and a second electromagnetic drive unit 405 that differ from the foregoing embodiments.

Figure 13:
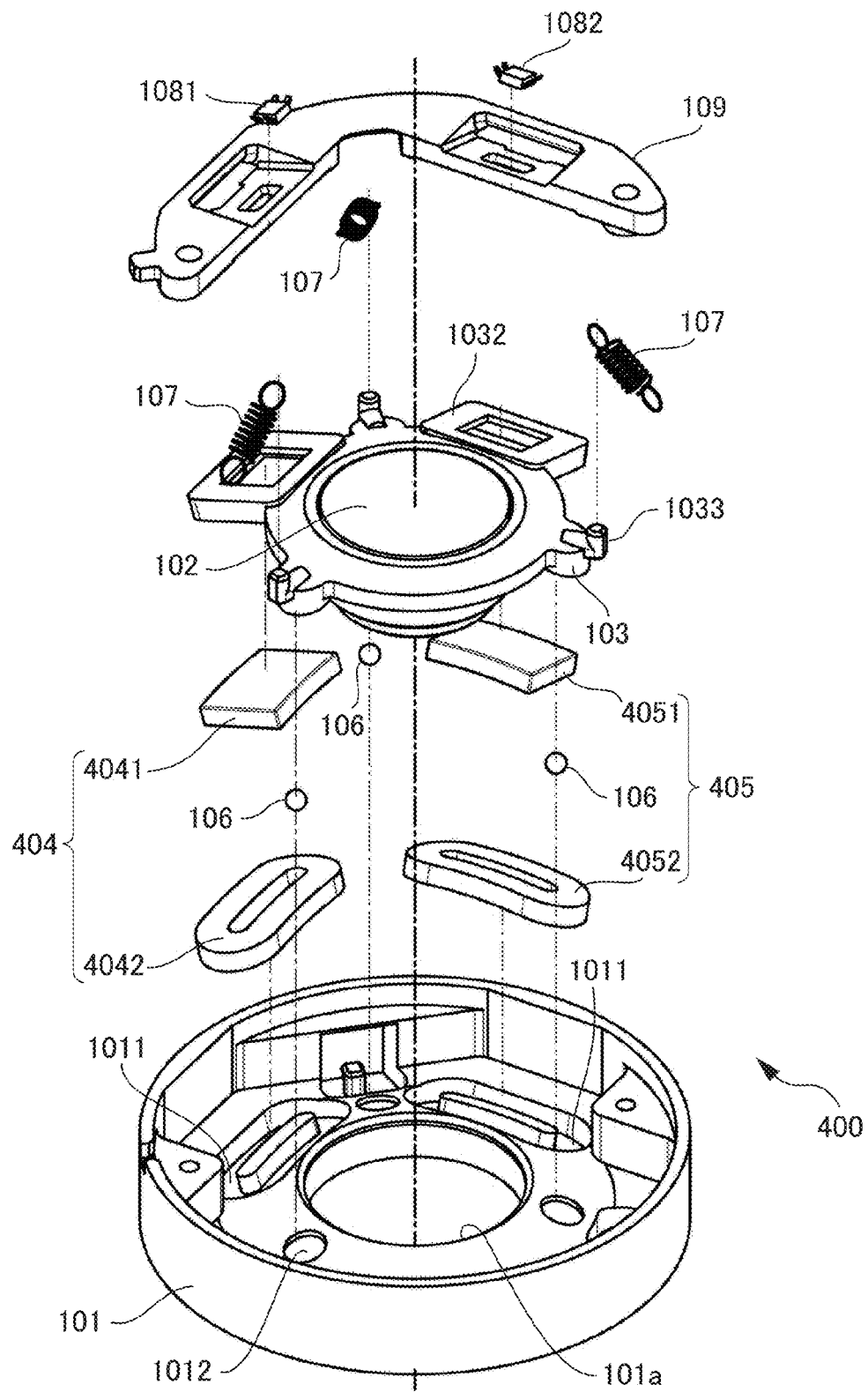
FIG. 13 is an exploded perspective view illustrating an image shake correcting apparatus of a fourth embodiment of the present invention.
Figure 14:
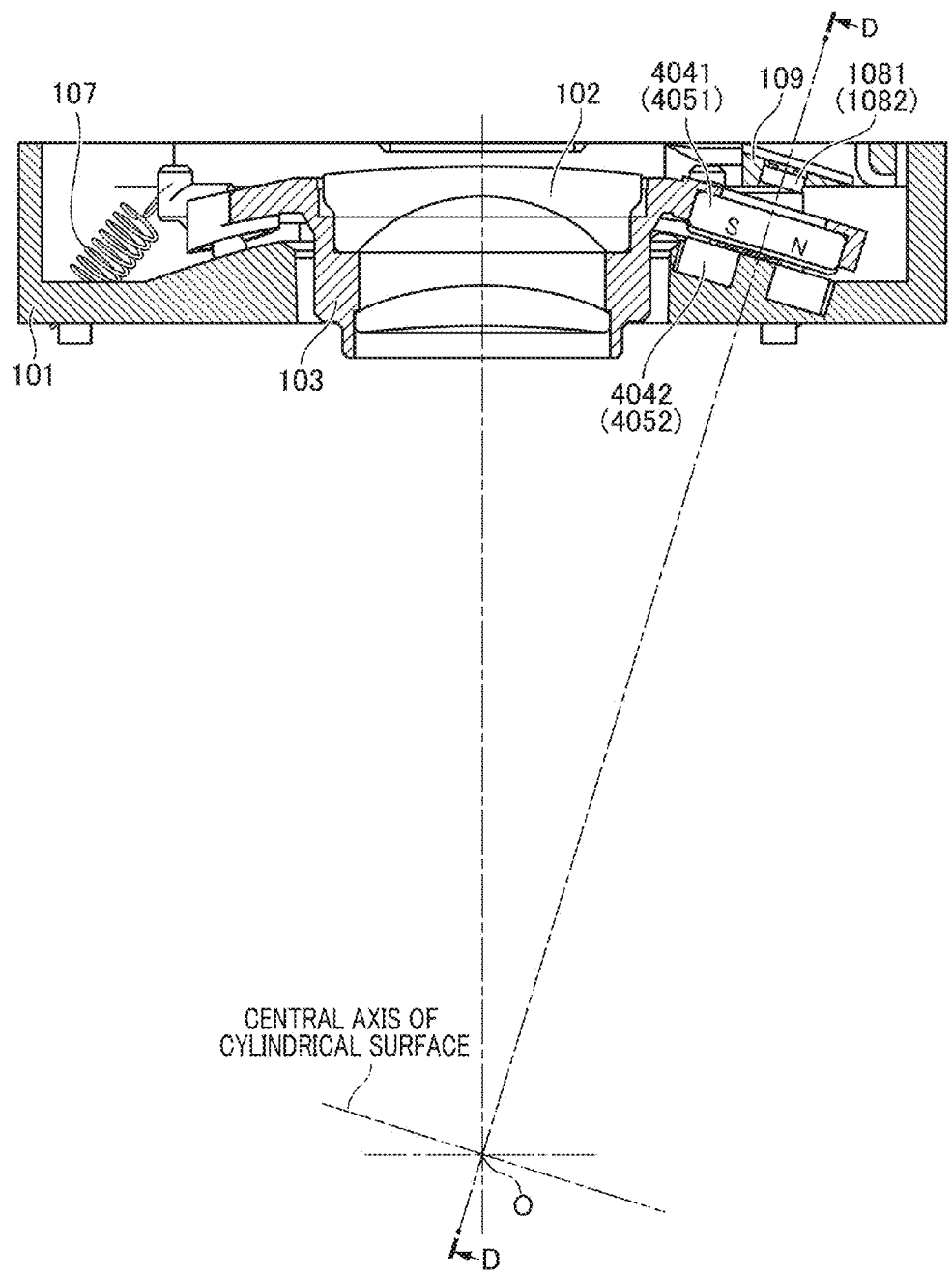
FIG. 14 is a cross-sectional view of the case where the image shake correcting apparatus of FIG. 13 is cut in a plane that is perpendicular to a rotational axis in the yaw direction and that passes through the rotational center point O.

FIG. 13 is an exploded perspective view which shows an exemplary configuration of the image shake correcting apparatus 400 of the present embodiment. The first electromagnetic drive unit 404 is configured by a first magnet 4041 and a first coil 4042, and the second electromagnetic drive unit 405 is configured by a second magnet 4051 and a second coil 4052. FIG. 14 is a cross-sectional view of the image shake correcting apparatus 400 in the case where a cut is made in a plane that is perpendicular to the rotational axis of the image shake correcting unit 103 in the yaw direction, and that passes through the rotational center point O and the centroid of the first electromagnetic drive unit. FIG. 15 is a cross-sectional view of the image shake correcting apparatus 400 (see line D-D in FIG. 14) in the case where a cut is made in a plane that is perpendicular to the rotational axis of the image shake correcting unit 103 in the pitch direction, and that passes through the rotational center point O and the centroid of the first electromagnetic drive unit.

With respect to the magnets 4041 and 4051 that respectively configure the electromagnetic drive units 404 and 405, the opposed surfaces that respectively face the coils 4042 and 4052 are formed in the shape of a cylindrical surface. Their central axes pass through the rotational center point O, and the orientations of the central axes parallel the respective drive directions of the electromagnetic drive units 404 and 405. The radial direction of the cylindrical surface is a direction oriented toward the centroid of the respective movable-side opposed surface from the rotational center point O, and the radius of the cylindrical surface is equal to the distance from the rotational center point O to the centroid of the respective movable-side opposed surface. The central axe of the cylindrical surface is shown in FIG. 14.

On the other hand, with respect to the coils 4042 and 4052 that respectively configure the electromagnetic drive units 404 and 405, the opposed surfaces that respectively face the magnets 4041 and 4051 are formed in the shape of a cylindrical surface. In the initial state, these cylinders are disposed so as to be coaxial with the opposed surfaces of the magnets 4041 and 4051 facing the respective coils, and the radius of the cylindrical surface is equal to the distance from the rotational center point O to the centroid of the respective fixed-side opposed surface.

By means of such arrangements, the gap change amount Δg of the magnet and the coil can be reduced. The reasons are described as follows. First, a description is given of a gap change amount of the magnet 4041 and the coil 4042 in the electromagnetic drive unit 404 in the case where the image shake correcting unit 103 is rotated in the yaw direction, i.e., in the case where it is rotated centering on a rotational axis that is perpendicular to the surface of the page of FIG. 14. The movable-side opposed surface is formed in the shape of a cylindrical surface, and its central axis is parallel with the drive direction of the electromagnetic drive unit 404. Consequently, the gap change amount of the magnet and the coil when rotation is conducted in the yaw direction is represented by Formula (4), as in the case of the first embodiment. The maximum distance Smax, which uses the foot of the perpendicular that descends from the rotational center point O to the movable-side opposed surface as reference, is half the length of the short-side direction of the magnet, and is shorter than in the case of the first embodiment. Accordingly, the value of the gap change amount Δg of the magnet and the coil can be reduced.

Figure 15:
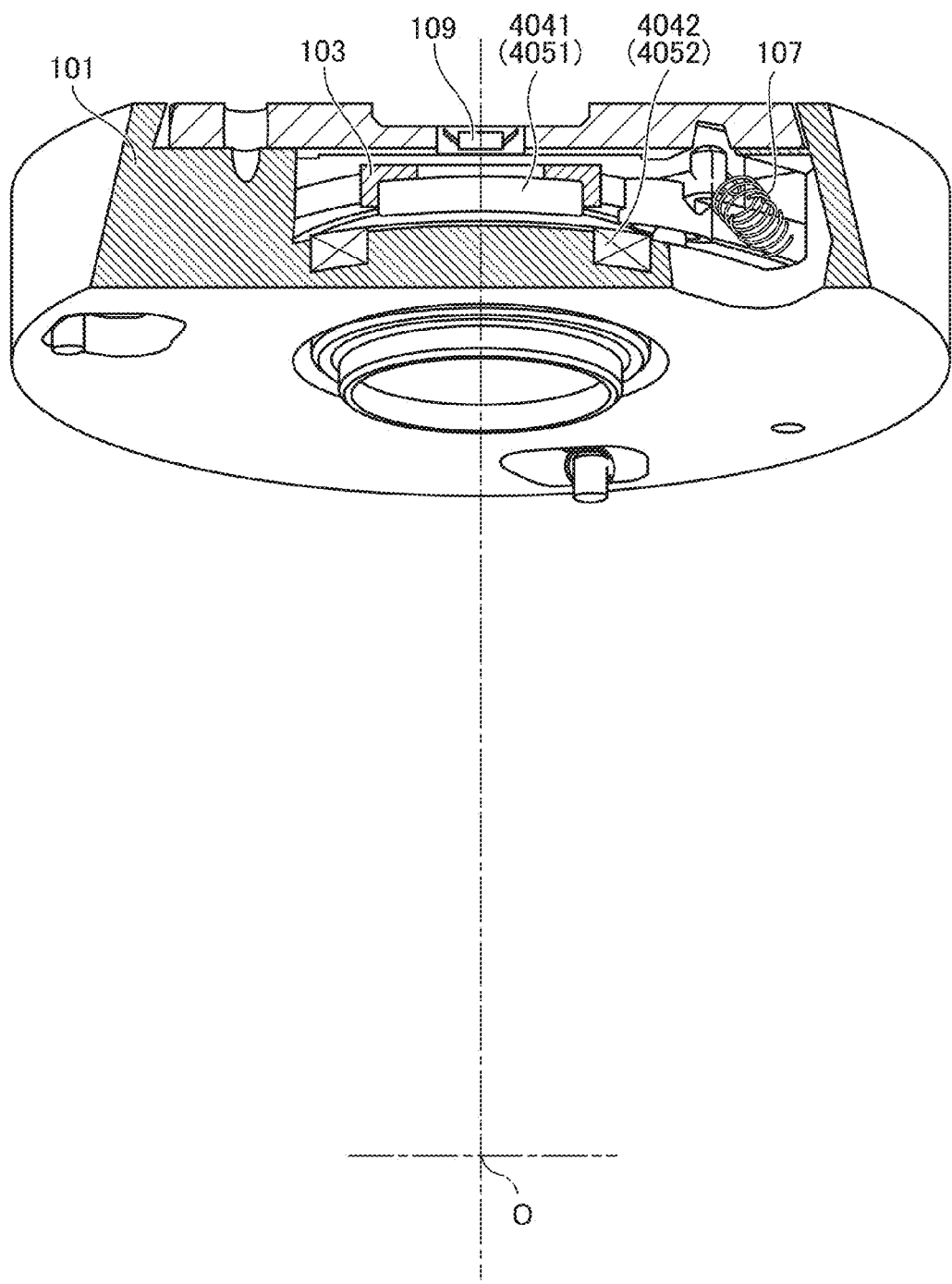
FIG. 15 is a cross-sectional view of the case where the image shake correcting apparatus of FIG. 13 is cut in a plane that is perpendicular to a rotational axis in the pitch direction and that passes through the rotational center point O.

Next, a description is given of a gap change amount of the magnet and the coil in the electromagnetic drive unit 404 in the case where the image shake correcting unit 103 is rotated in the pitch direction, i.e., in the case where it is rotated centering on a rotational axis that is perpendicular to the surface of the page of FIG. 15. In this case, rotation is conducted while the movable-side opposed surface maintains a coaxial relationship relative to the fixed-side opposed surface. Accordingly, the geometric gap change amount Δg is ideally zero. In reality, there is an amount deriving from machining accuracy or assembly error, but it is within an allowable range. As described above, in the fourth embodiment, by forming the opposed surfaces that respectively face the magnet and the coil into the shape of a cylindrical surface, the gap change amount can be reduced compared to the case where the opposed surfaces are made planar, thereby enabling further mitigation of output variation of the electromagnetic drive unit.

By causing the rotational axis of the cylindrical surface to coincide with the lengthwise direction of the electromagnetic drive unit, i.e., by having it parallel the drive direction, the gap change amount of the magnet and the coil can be further reduced. The reasons are described as follows. In a voice coil motor with a configuration in which the coil is arranged in opposition to the magnetized surface of the magnet, the drive force is proportional to the length of the conductive wire of the coil that opposes the magnetized surface of the magnet, and operates in a direction perpendicular to the direction of current. Therefore, in order to assure sufficient drive force, it is often the case that the form of the electromagnetic drive unit is designed so that the direction perpendicular to the drive direction is the opposed surface of the rectangular form that constitutes the lengthwise direction. As stated above, the maximum gap change amount Δgmax of the magnet and the coil decreases as the value of the maximum distance Smax from the foot of the perpendicular that descends from the rotational center point O to the opposed surface decreases. Therefore, if the rotational axis of the cylindrical surface is made to coincide with the lengthwise direction of the electromagnetic drive unit, output variation of the electromagnetic drive unit can be reduced.

In the present embodiment, the central axis of the fixed-side opposed surface and the central axis of the movable-side opposed surface are disposed to pass through the rotational center point O. Consequently, a gap change amount of zero can be obtained when the image shake correcting unit 103 is rotated in the pitch direction centering on the rotational center point O. However, there are also cases where such a disposition cannot be adopted due to the increased difficulty of machining, or for other reasons. In such cases, it is possible to approximate the aforementioned effect by setting the central axis of rotation of the opposed surface (cylindrical surface) in the vicinity of the rotational center point O. This is because the central axis of rotation of the cylindrical surface can more closely approach the rotational center point O in the case where the central axis of the cylindrical surface and the rotational center point O are disposed on the same side when viewed from the correcting lens 102 than in the case where they are not.

In the present embodiment, the central axis of the fixed-side opposed surface and the central axis of the movable-side opposed surface are coaxially disposed, enabling the gap change amount to be made zero when the movable member is rotated in the pitch direction centering on the rotational center point O. On the other hand, there are cases where such a disposition is difficult due to restrictions on machining and the like. In such cases, it is possible that interference between the mated opposed surfaces may occur when the radius of the opposed surface on the inner side (the fixed-side opposed surface in FIG. 14) that is closer to the rotational center point O increases, and when the radius of the opposed surface on the outer side (the movable-side opposed surface in FIG. 14) that is farther from the rotational center point O decreases. To avoid interference in the case where the two opposed surfaces are not coaxially disposed, it is advisable to make the radius of curvature of the opposed surface on the outer side when viewed from the rotational center point O relatively large, and the radius of curvature of the opposed surface on the inner side relatively small. Although the average value of the gap of the coil and the magnet increases compared to the case where the central axes of the respective opposed surfaces are coaxially disposed, occurrence of interference between the members can be avoided.

Due to restrictions on machining and the like, it may happen that one of the opposed surfaces is made a cylindrical surface, while the other opposed surface is made a planar surface. In this case, as the radius of curvature of the planar surface is considered as an infinite circle, the opposed surface made in planar form should be disposed on the outer side when viewed from the rotational center point O, and the opposed surface made in cylindrical form should be disposed on the inner side when viewed from the rotational center point O.

Next, a description is given of matters relating to manufacture of the magnet and the coil. To manufacture magnets with satisfactory productivity, a method of production that uses molds is common. To manufacture coils with satisfactory productivity, a method of production that winds wire rod on a spool is common. As it is relatively easy to prepare a mold with a cylindrical surface portion, a magnet with a cylindrical surface portion can be manufactured relatively easily. On the other hand, in the case of the oval coil used in the present embodiment, as it is necessary to impart a cylindrical form to the bottom surface of the spool to form the opposed surface that faces the magnet as a cylindrical surface, and as a complex winding method is required to wind the coil along the bottom surface, the degree of difficulty of machining is higher than when configuring the opposed surface with a planar surface alone. Therefore, with respect to the magnet and the coil, in the case where one of the opposed surfaces is planar and the other opposed surface is cylindrical, manufacturing is facilitated and cost reduction is fostered by making the opposed surface of the magnet that faces the coil cylindrical, and by making the opposed surface of the coil that faces the magnet planar. In this case, for the reasons stated above, it is sufficient if the magnet is disposed on the side that is closer to the rotational center point O, and if the coil is disposed on the side that is farther from the rotational center point O.

Next, a description is given of the gap between the magnet and the magnetic detection unit. In the present embodiment, in the initial state, the magnetic detection unit (see the position sensors 1081, 1082 in FIG. 14) is disposed on a line drawn from the rotational center point O to the centroid of the movable-side opposed surface. Consequently, the gap change amount of the magnet and the magnetic detection unit can be reduced. Accordingly, the measurement range required for the magnetic detection unit can be reduced, and the position of the image shake correcting unit 103 can be stably detected.

(Fifth Embodiment)

Figure 17:
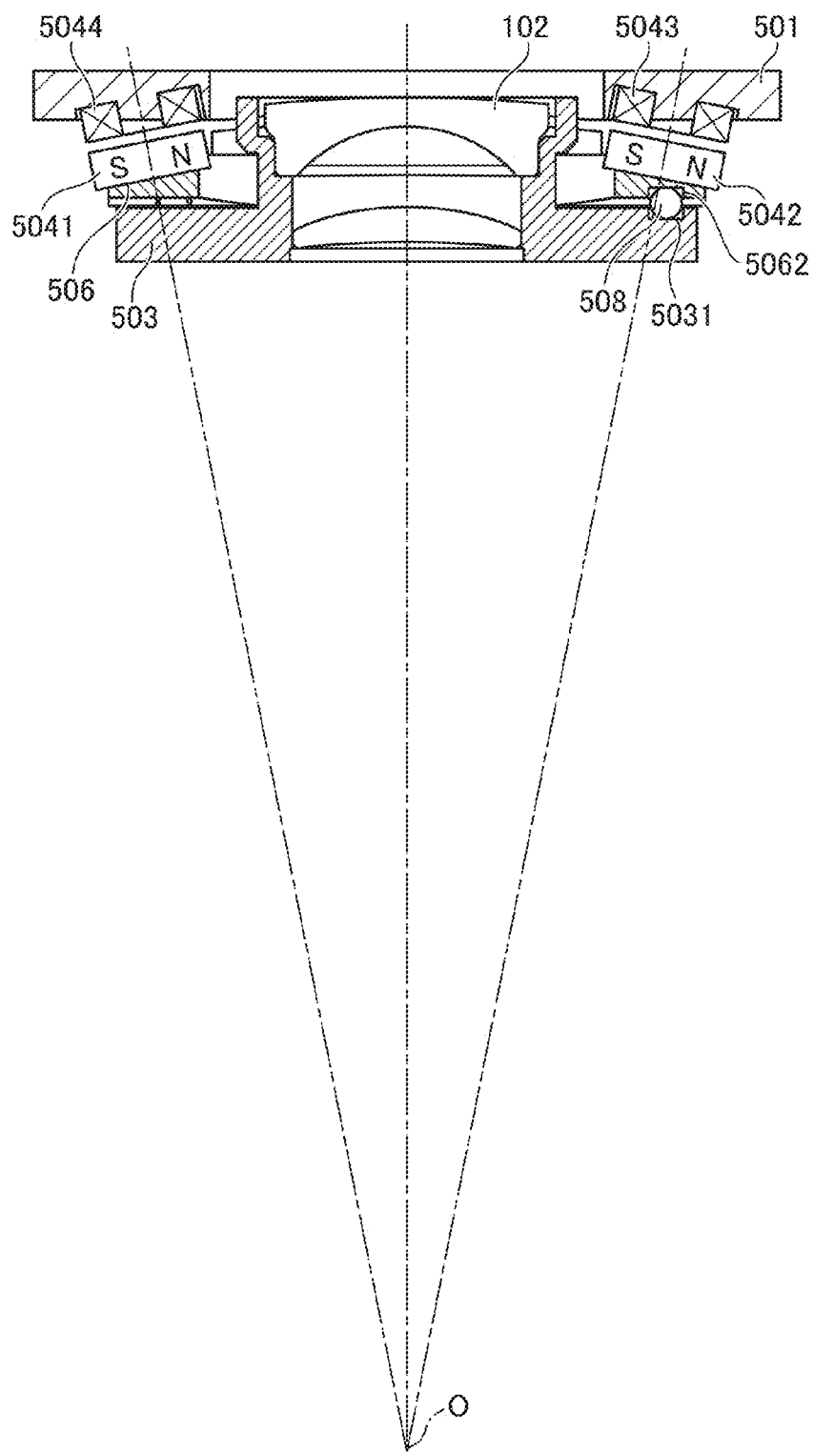
FIG. 17 is a cross-sectional view of the case where the image shake correcting apparatus of FIG. 16 is cut in a plane that is perpendicular to a rotational axis in the yaw direction and that passes through the rotational center point O.
Figure 18:
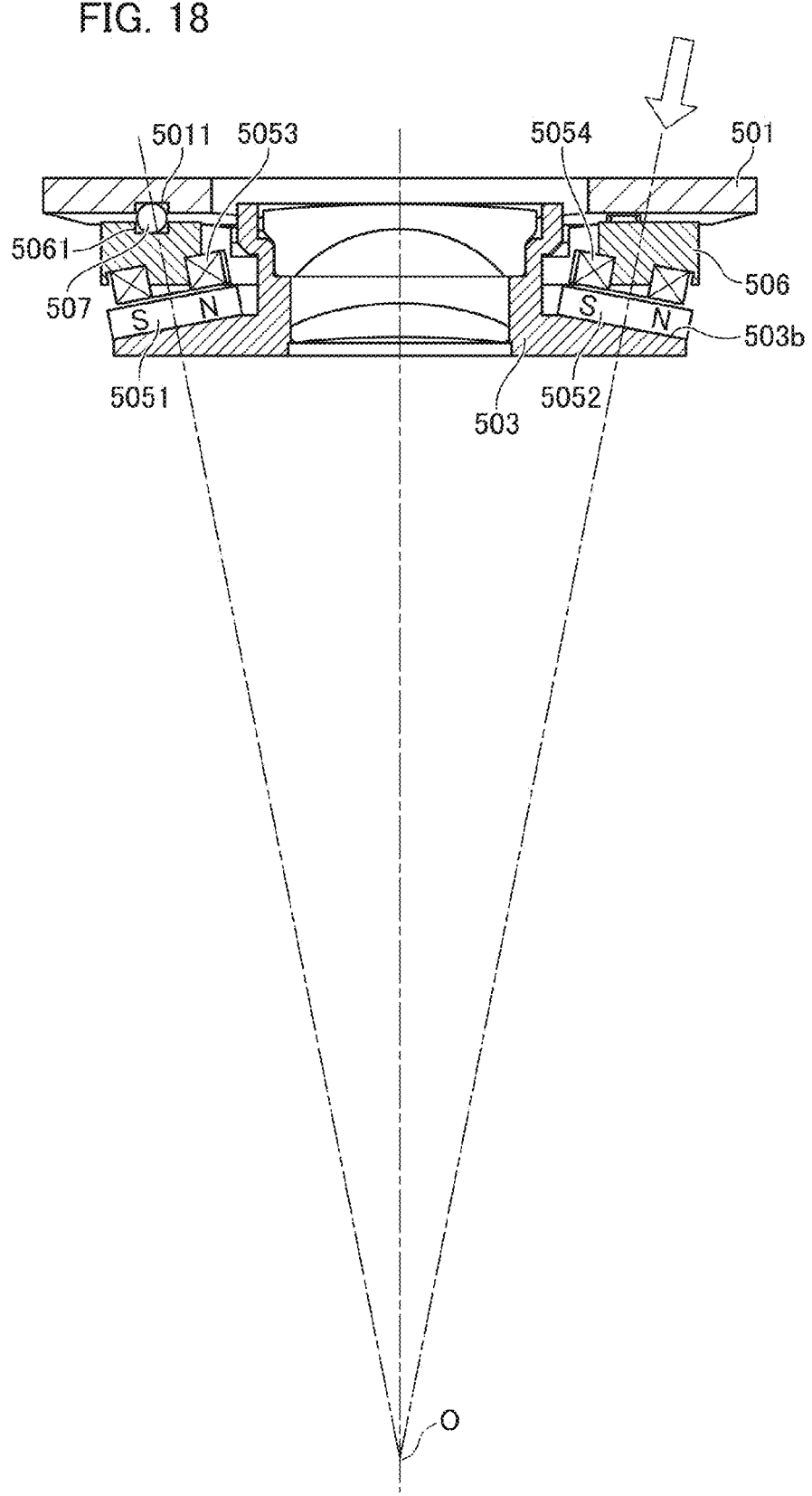
FIG. 18 is a cross-sectional view of the case where the image shake correcting apparatus of FIG. 16 is cut in a plane that is perpendicular to a rotational axis in the pitch direction and that passes through the rotational center point O.

Next, a fifth embodiment of the present invention is described with reference to FIGS. 16 to 18. Among the components of an image shake correcting apparatus 500 of the present embodiment, the following description focuses on a fixed member 501, an image shake correcting unit 503, and electromagnetic drive unit 504, and electromagnetic drive unit 505, and an intermediate moving member 506. The first electromagnetic drive unit 504 is configured with a first magnet 5041, a second magnet 5042, a first coil 5043, and a second coil 5044. The second electromagnetic drive unit 505 is configured with a third magnet 5051, a fourth magnet 5052, a third coil 5053, and a fourth coil 5054.

First rolling members 507 and second rolling members 508 are all balls. The intermediate moving member 506 is supported on the fixed member 501 via the first rolling members 507, and the image shake correcting unit 503 is supported on the intermediate moving member 506 via the second rolling members 508. Consequently, the configuration is such that the intermediate moving member 506 is capable of relative movement with respect to the fixed member 501, and the image shake correcting unit 503 is capable of relative movement with respect to the intermediate moving member 506.

Figure 16:
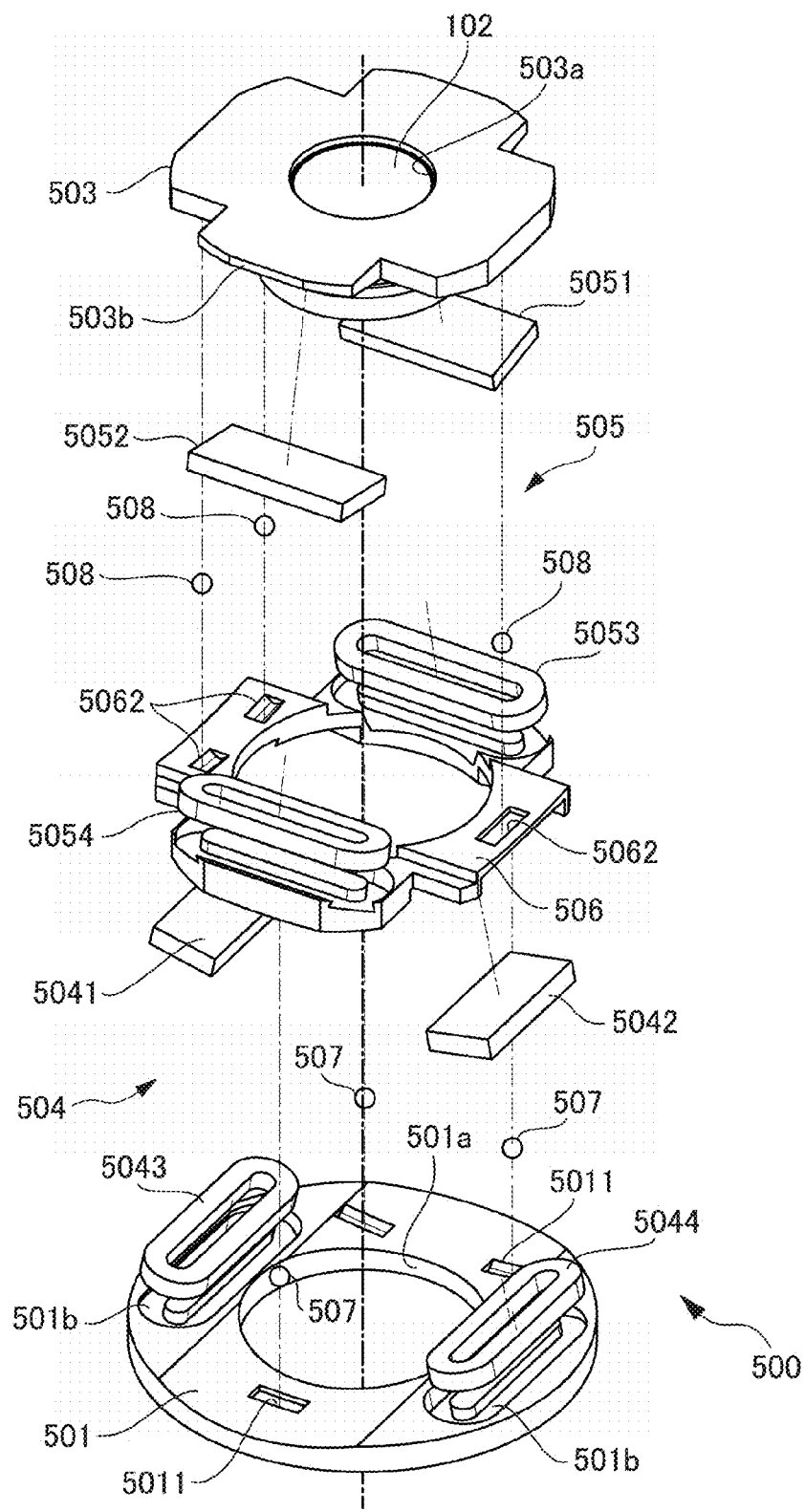
FIG. 16 is an exploded perspective view illustrating an image shake correcting apparatus of a fifth embodiment of the present invention.

FIG. 16 is an exploded perspective view which shows components of the image shake correcting apparatus 500. FIG. 17 is a cross-sectional view of the image shake correcting apparatus 500 in the case where a cut is made in a plane that is perpendicular to the rotational axis when rotation is conducted in the yaw direction, and that passes through the rotational center point O and the centroid of the first electromagnetic drive unit 504. FIG. 18 is a cross-sectional view of the image shake correcting apparatus 500 in the case where a cut is made in a plane that is perpendicular to the rotational axis when rotation is conducted in the pitch direction, and that passes through the rotational center point O and the centroid of the second electromagnetic drive unit 505. The fixed member 501 is formed in a roughly discoid shape, and is held in a lens barrel (not illustrated in the drawings). The lens barrel contains the image shake correcting apparatus 500 and another lens group that configures the imaging optical system. By disposing the image shake correcting unit 503 in an aperture 501a located at the center of the fixed member 501, the range of mobility of the image shake correcting unit 503 is limited. The fixed member 501 has coil holders 501b at two sites on the outer periphery of the aperture 501a, where the first coil 5043 and the second coil 5044 are respectively held.

The fixed member 501 has multiple yaw-direction ball receivers 5011, which are receivers for the first rolling members 507. The bottom surface of a yaw-direction ball receiver 5011 is configured with a shape that has a V-shaped cross-section, or with a shape that forms part of a cylindrical surface whose central axis of rotation is a straight line that passes through the rotational center point O and that parallels the pitch direction. Consequently, the first rolling member 507 can rotate and move in the yaw direction centering on a rotational axis that passes through the rotational center point O.

The image shake correcting unit 503 which is a holding member of an optical component holds the correcting lens 102 at the center of an aperture 503a. The image shake correcting unit 503 has multiple pitch-direction ball receivers 5031 (see FIG. 17), which are receivers for the second rolling members 508. The bottom surface of a pitch-direction ball receiver 5031 is configured with a shape that has a V-shaped cross-section, or with a shape that forms part of a cylindrical surface whose central axis of rotation is a straight line that passes through the rotational center point O and that parallels the yaw direction. Consequently, the second rolling member 508 can rotate and move in the pitch direction centering on a rotational axis that passes through the rotational center point O. In addition, the image shake correcting unit 503 has multiple magnet holders 503b, wherein the third magnet 5051 and the fourth magnet 5052 are respectively held.

The first electromagnetic drive unit 504 is a voice coil motor. In the present embodiment, a single electromagnetic drive unit is configured by juxtaposition of two voice coil motors. The first magnet 5041 is formed roughly in the shape of a rectangular parallelepiped, and is attached to the intermediate moving member 506. With respect to the first magnet 5041, the opposed surface facing the first coil 5043 is a rectangular planar surface, is divided in two at the center respectively into N pole and S pole, and is magnetized in the normal-line direction of the opposed surface. As shown in FIG. 17, the foot of the perpendicular that descends from the rotational center point O to the opposed surface of the first magnet 5041 facing the first coil 5043 is disposed so as to pass through the centroid of the opposed surface. The second magnet 5042 is formed roughly in the shape of a rectangular parallelepiped, is disposed sandwiching the correcting lens 102 on the side opposite the first magnet 5041, and is attached to the intermediate moving member 506. With respect to the second magnet 5042, the surface facing the second coil 5044 is a rectangular planar surface, is divided in two at the center respectively into N pole and S pole, and is magnetized in the normal-line direction of the opposed surface. As shown in FIG. 17, the foot of the perpendicular that descends from the rotational center point O to the opposed surface of the second magnet 5042 facing the second coil 5044 is disposed so as to pass through the centroid of the opposed surface.

The first coil 5043 is a coil formed in an oval shape, and is attached to the fixed member 501 so that it opposes the magnetized surface of the first magnet 5041. The opposed surface that faces the magnetized surface of the first magnet 5041 is planar, and Lorentz is generated in the yaw direction, which is the direction perpendicular to the magnetization direction and energization direction of the first magnet 5041, by energization of the first coil 5043. The second coil 5044 is a coil formed in an oval shape, and is disposed in the fixed member 501 sandwiching the correcting lens 102 on the side opposite the first coil 5043 so as to oppose the magnetized surface of the second magnet 5042. In the second coil 5044, the surface that opposes the magnetized surface of the second magnet 5042 is planar. By energization of the second coil 5044, Lorentz is generated in the yaw direction which is the direction perpendicular to the magnetization direction and energization direction of the second magnet 5042. Otherwise, the current that flows to the second coil 5044 at this time may be the same phase as the current that flows to the first coil 5043, and the first coil 5043 and the second coil 5044 may be electrically connected in a serial manner.

The second electromagnetic drive unit 505 is a voice coil motor, and in the present embodiment, a single electromagnetic drive unit is configured by juxtaposition of two voice coil motors. The third magnet 5051 and the fourth magnet 5052 are formed roughly in the shape of the rectangular parallelepiped, and are attached to the image shake correcting unit 503. The fourth magnet 5052 is disposed sandwiching the correcting lens 102 on the side opposite the third magnet

5051. In the third magnet 5051, the surface facing the third coil 5053 is a rectangular planar surface, is divided in two at the center respectively into N pole and S pole, and is magnetized in the normal line direction of the opposed surface. Similarly, in the fourth magnet 5052, the surface facing the fourth coil 5054 is a rectangular planar surface. As shown in FIG. 18, the foot of the perpendicular that descends from the rotational center point O to the opposed surface of the third magnet 5051 facing the third coil 5053 is disposed so as to pass through the centroid of the opposed surface. Moreover, the foot of the perpendicular that descends from the rotational center point O to the opposed surface of the fourth magnet 5052 facing the fourth coil 5054 is disposed so as to pass through the centroid of the opposed surface.

The third coil 5053 and the fourth coil 5054 are coils that are formed in an oval shape, and are attached to the intermediate moving member 506 in a state where they respectively oppose the magnetized surfaces of the third magnet 5051 and the fourth magnet 5052. The fourth magnet 5052 is disposed in the intermediate moving member 506 sandwiching the correcting lens 102 on the side opposite the third coil 5053. In the third coil 5053, the opposed surface facing the magnetized surface of the third magnet 5051 is planar. By energization of the third coil 5053, Lorentz is generated in the pitch direction which is the direction perpendicular to the magnetization direction and energization direction of the third magnet 5051. Moreover, in the fourth coil 5054, the opposed surface facing the magnetized surface of the fourth magnet 5052 is planar. By energization of the fourth coil 5054, Lorentz is generated in the pitch direction which is the direction perpendicular to the magnetization direction and energization direction of the fourth magnet 5052. Otherwise, the current that flows to the forth coil 5054 at this time may be the same phase as the current that flows to the third coil 5053, and the third coil 5053 and the fourth coil 5054 may be electrically connected in a serial manner.

The respective outputs of the electromagnetic drive units 504 and 505 increase as the area of opposition of magnet and coil increases. Accordingly, a prescribed area of opposition is required in order to obtain a prescribed output within a determined voltage. As multiple electromagnetic drive units are disposed on the outer periphery of the correcting lens 102, interference with the optical path of the correcting lens 102 can be avoided. The intermediate moving member 506 is disposed between the fixed member 501 and the image shake correcting unit 503, and the opposed surface facing the fixed member 501 has multiple yaw direction ball receivers 5061. The yaw direction ball receiver 5061 is configured with a shape that has a V-shaped cross-section, or with a shape that forms part of a cylindrical surface whose central axis of rotation is a straight line that passes through the rotational center point O and that parallels the pitch direction. Consequently, the first rolling member 507 can rotate and move in the yaw direction centering on a rotational axis that passes through the rotational center point O. Moreover, the intermediate moving member 506 has multiple pitch direction ball receivers 5062 on the opposed surface facing the image shake correcting unit 503. The pitch-direction ball receiver 5062 has a shape that has a V-shaped cross-section, or a shape that forms part of a cylindrical surface whose central axis of rotation is a straight line that passes through the rotational center point O and that parallels the yaw direction. Consequently, the second rolling member 508 can rotate and move in the pitch direction centering on a rotational axis that passes through the rotational center point O. The intermediate moving member 506 holds the first magnet 5041 and the second magnet 5042 on one side, and holds the third coil 5053 and the fourth coil 5054 on the opposite side.

The first rolling members 507 conduct rolling support of the intermediate moving member 506 with respect to the fixed member 501. In the present embodiment, the number of first rolling members 507 is three, and the intermediate moving member 506 receives rolling support in the yaw direction centering on a rotational axis that passes through the rotational center point O. The second rolling members 508 conduct rolling support of the image shake correcting unit 503 with respect to the intermediate moving member 506. In the present embodiment, the number of second rolling members 508 is three, and the image shake correcting unit 503 receives rolling support in the pitch direction centering on a rotational axis that passes through the rotational center point O.

Otherwise, although illustration thereof is omitted, biasing force is exerted by an elastic member and a magnetic bias unit in the direction of mutual attraction between the fixed member 501 and the image shake correcting unit 503. Consequently, the first and second rolling members are constantly maintained in a state of contact with the respective ball receivers.

Next, a description is given of the operations of the image shake correcting apparatus in the present embodiment. The intermediate moving member 506 is rotatably supported on the fixed member 501 in the yaw direction centering on a first rotational axis that passes through the rotational center point O. The image shake correcting unit 503 is rotatably supported on the intermediate moving member 506 in the pitch direction centering on a second rotational axis that passes through the rotational center point O. Accordingly, the image shake correcting unit 503 is rotatably supported on the fixed member 501 centering on the first and second rotational axes that intersect at the rotational center point O. In this state, when energization is conducted with respect to the first coil 5043 and the second coil 5044, the intermediate moving member 506 is driven in the yaw direction. By energization of the third coil 5053 and the fourth coil 5054, the image shake correcting unit 503 is driven in the pitch direction.

In the case where the image shake correcting unit 503 is driven in the yaw direction as described above, the image shake correcting unit 503, the second electromagnetic drive unit 505, the intermediate moving member 506, and the second rolling members 508 correspond to a movable unit. That is, the intermediate moving member 506 is a first movable member, the image shake correcting unit 503 is a second movable member, and a movable unit including the two is configured. The movable unit rotates relative to the fixed member 501 centering on the yaw-direction rotational axis. The drive force generated at this time is based on Lorentz force from the first electromagnetic drive unit 504. In the case where the image shake correcting unit 503 is driven in the pitch direction, a portion including the fixed member 501, the first electromagnetic drive unit 504, the intermediate moving member 506, and the first rolling members 507 corresponds to a fixed unit. The intermediate moving member 506 is the first movable member, but in this case can be considered as a fixed part relative to the image shake correcting unit 503 which is the second movable member. The image shake correcting unit 503 rotates relative to the fixed unit centering on the pitch-direction rotational axis. The drive force generated at this time is based on Lorentz force from the second electromagnetic drive unit 505.

Figure 19:
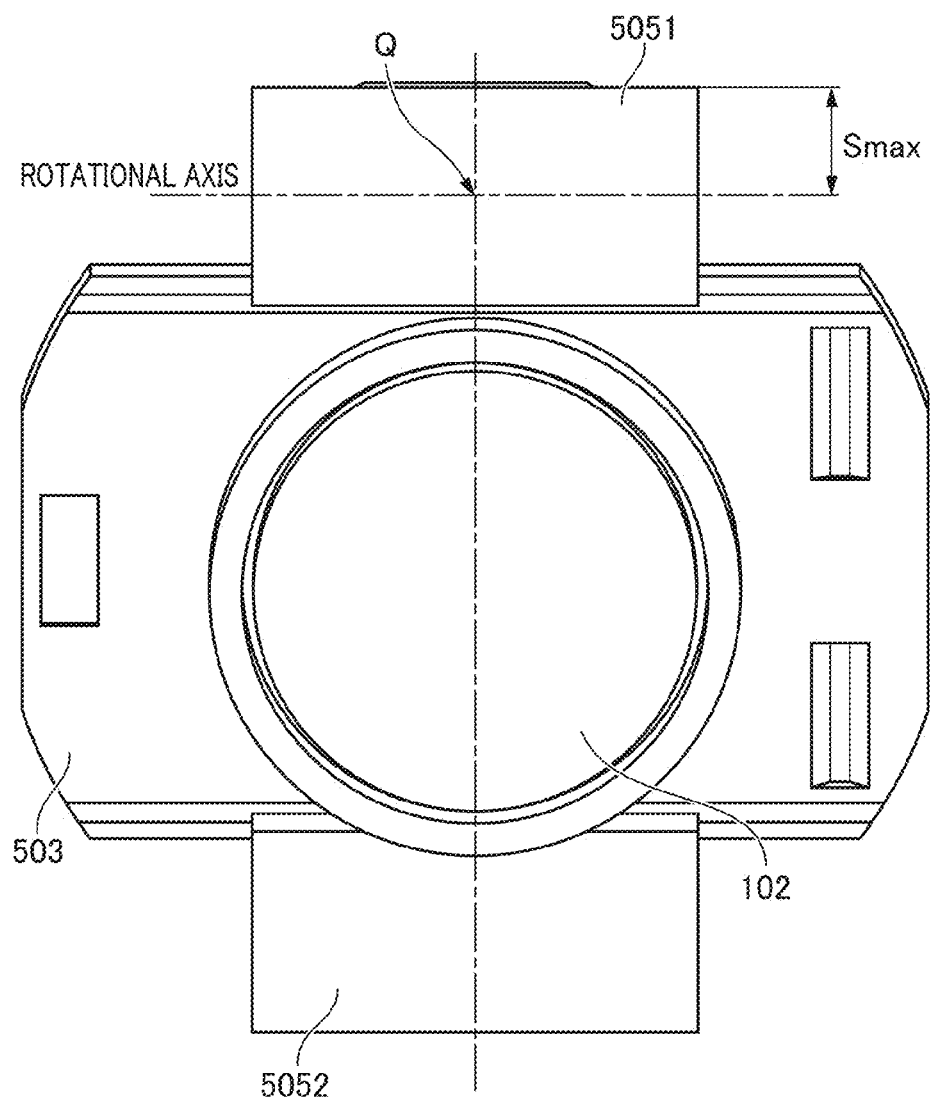
FIG. 19 is a diagram of the case where the image shake correcting apparatus of FIG. 16 is viewed from a normal line direction of a first magnet.

According to the present embodiment, the following effects are obtained. The gap change amount of the magnet and the coil can be reduced. The gap change amount of the magnet and coil can be represented by the foregoing Formula (4), and varies according to the S value (see S shown in FIG. 7). In the case of the first embodiment, the relative positional relationship of magnet and coil changes along the spherical surface centering on the rotational center point O. That is, the magnet rotates relative to the coil centering on an optional rotational axis that passes through the rotational center point O and that is perpendicular to the optical axis. Accordingly, the maximum value of the variable S had to adopt the maximum value of a distance using a single point as reference, i.e., the foot of a perpendicular that descends from the rotational center point O to the movable-side opposed surface. On the other hand, in the fifth embodiment, the relative positional relationship of magnet and coil varies according to rotation centering on a rotational axis that passes through the rotational center point O and that is perpendicular to the drive direction. Accordingly, the maximum value of the variable S is a maximum value from a radial line that is projected from the rotational axis to the movable-side opposed surface. FIG. 19 is a frontal view which shows the image shake correcting unit 503 as well as the third magnet 5051 and the fourth magnet 5052 when viewed from the rotational center point O (see the white arrow mark direction in FIG. 18). FIG. 19 is a drawing corresponding to FIG. 8 that was described in the first embodiment.

As in the present embodiment, in the case where the foot of a perpendicular that descends from the rotational center point O to the movable-side opposed surface passes through the centroid of the movable-side opposed surface, the maximum value Smax is half the length of the short side of the movable-side opposed surface, as shown in FIG. 19. This is the minimum value in the case where the movable-side opposed surface is configured with a single planar surface. Accordingly, the value of the gap change amount Δg of the magnet and the coil can be reduced, and output variation of the electromagnetic drive unit can be reduced. Otherwise, in the case where it is difficult to satisfy the aforementioned conditions due to limitations on machining or the like, effects identical to those described above can be obtained by setting the positional relationship of the rotational center point O and the movable-side opposed surface according to the conditions described in the aforementioned second embodiment.

(Sixth Embodiment)

Figure 20:
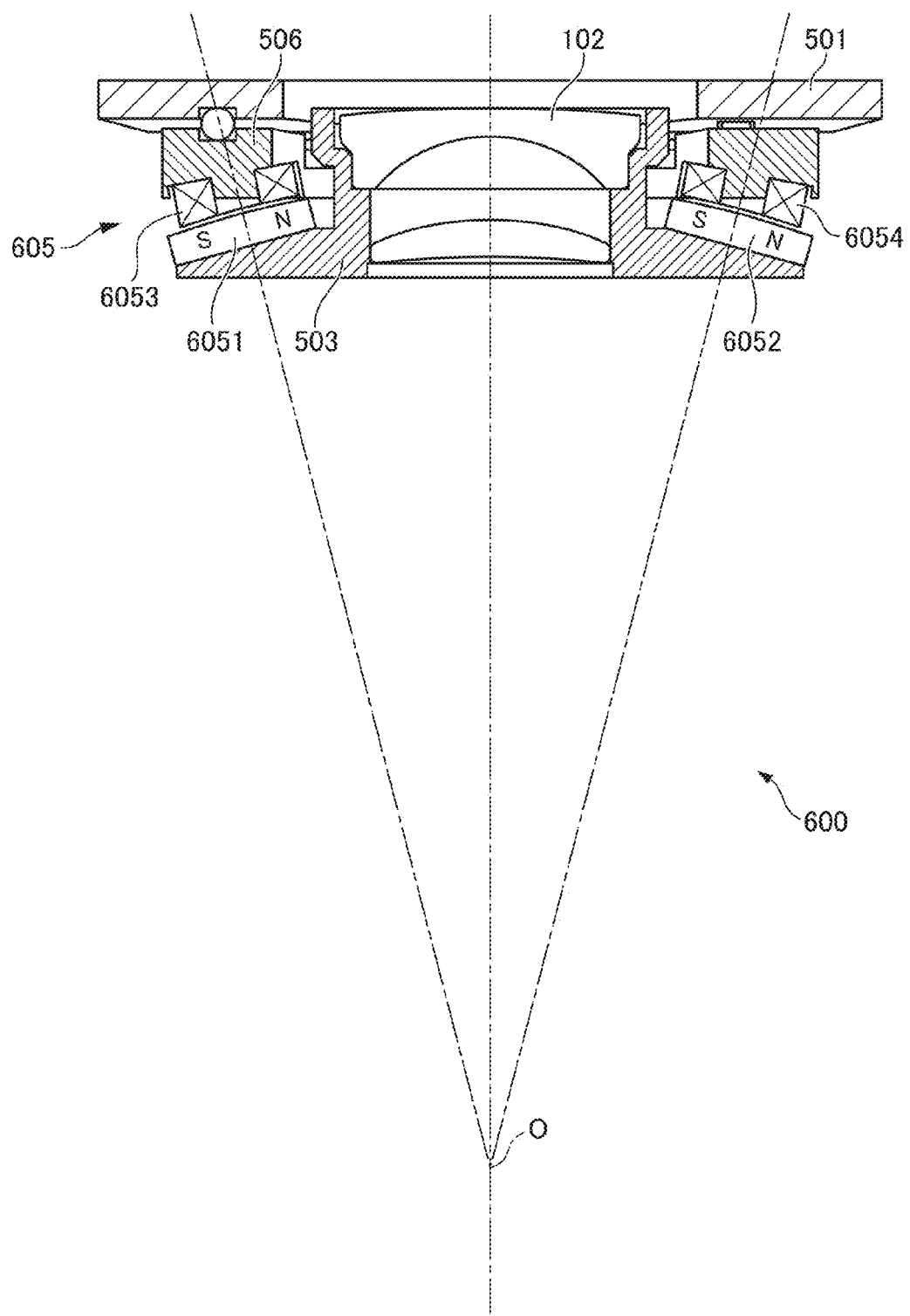
FIG. 20 is a cross-sectional view of the case where the image shake correcting apparatus of a sixth embodiment of the present invention is cut in a plane that is perpendicular to a rotational axis in the pitch direction and that passes through the rotational center point O.

Next, an image shake correcting apparatus 600 of a sixth embodiment of the present invention is described with reference to FIG. 20. FIG. 20 is a cross-sectional view of the image shake correcting apparatus 600 in the case where a cut is made in a plane that is perpendicular to the rotational axis when rotation is conducted in the pitch direction, and that passes through the rotational center point O and the centroid of the first electromagnetic drive unit. The following description focuses on the points of difference with the fifth embodiment.

A second electromagnetic drive unit 605 is configured by a third magnet 6051, a fourth magnet 6052, a third coil 6053, and a fourth coil 6054. The third magnet 6051 is attached to the image shake correcting unit 503, and the opposed surface that faces the third coil 6053 is cylindrically formed. The fourth magnet 6052 is disposed on the image shake correcting unit 503 sandwiching the correcting lens 102 on the side opposite the third magnet 6051, and the opposed surface facing the fourth coil 6054 is cylindrically formed. The third coil 6053 is a coil that is formed in an oval shape, and is attached to the intermediate moving member 506 in a state of opposition to the magnetized surface of the third magnet 6051. In the third coil 6053, the opposed surface facing the magnetized surface of the third magnet 6051 is cylindrically formed. This cylindrical surface passes through the rotational center point O, and has a central axis that parallels the pitch direction. By energizing the third coil 6053, Lorentz force is generated in the pitch direction, which is the direction perpendicular to the magnetization direction and energization direction of the third magnet 6051.

The fourth coil 6054 is a coil that is formed in an oval shape, and is attached to the intermediate moving member 506 in a state of opposition to the magnetized surface of the fourth magnet 6052, sandwiching the correcting lens 102 on the side opposite the third coil 6053. In the fourth coil 6054, the opposed surface facing the magnetized surface of the fourth magnet 6052 is cylindrically formed. This cylindrical surface passes through the rotational center point O, and has a central axis that parallels the pitch direction. By energization of the fourth coil 6054, Lorentz force is generated in the pitch direction, which is the direction perpendicular to the magnetization direction and energization direction of the fourth magnet 6052.

In the present embodiment, the respective opposed surfaces of the third magnet 6051, the fourth magnet 6052, the third coil 6053, and the fourth coil 6054 all form parts of coaxial cylindrical surfaces. In the case where the opposed surfaces of magnet and coil are cylindrically formed in a structure using the intermediate moving member 506, by making the central axis of the cylindrical surface perpendicular to the drive direction of the electromagnetic drive unit, the gap change amount can be reduced to the utmost, and output variation of the electromagnetic drive unit can be minimized.

As described in the fifth embodiment, in a structure using the intermediate moving member 506, relative positional change of the magnet and the coil conforms to rotation centering on a rotational axis that passes through the rotational center point O, and that is perpendicular to the drive direction. Consequently, when the opposed surfaces of the coil and the magnet are cylindrically shaped using the rotational axis as the central axis, the geometric gap change amount Δg accompanying rotation can be made zero (components derived from machining accuracy or assembly error are ignored).

Otherwise, in the case where it is difficult to have a disposition where the central axis of the cylindrical surface passes through the rotational center point O, it is sufficient if the central axis of rotation of the cylindrical surface approaches the rotational center point O. In the case where the central axis of the cylindrical surface and the rotational center point O are disposed on the same side when viewed from the correcting lens 102, the effect is obtained that the gap change amount of magnet and coil is further reduced, thereby enabling mitigation of output variation of the electromagnetic drive unit. Designing the opposed surfaces of the magnet and the coil in a cylindrical shape lowers the degree of difficulty of machining compared to the case of a spherical shape, thereby contributing to cost reduction and quality stabilization in manufacturing.

(Other Embodiments)

With respect to the foregoing embodiments, a description was given of a configuration in which, for example, rolling members are disposed between two spherical surfaces that are respectively formed in a coaxial manner in a mobile part and a fixed part, and the mobile part is movably supported on a spherical surface centering on a rotational center point O. However, one is not limited thereto, and it is also acceptable to use a structure in which the spherical surface part provided in the mobile part and the spherical surface part provided in the fixed part are supported in a slideable manner without use of rolling members. In an embodiment where the magnet is disposed in the mobile part and the coil is disposed in the fixed part, there is no need for power supply to the mobile part, thereby making it possible to prevent the mobile part from sustaining external force due to power cable deformation or friction or the like. On the other hand, in an embodiment where the coil is disposed in the mobile part and the magnet is disposed in the fixed part, the weight of the mobile part can be reduced if the magnet weighs more than the coil. In either embodiment, the effects of the present invention can be similarly obtained.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-239218 filed on Oct. 30, 2012 which is hereby incorporated by reference herein in its entirety.

What is claimed is:

1. An image shake correcting apparatus, comprising:
a movable member configured to hold an image shake correcting member;
a fixed member configured to hold the movable member so as to be movable along a spherical surface centering on a rotational center point; and
an electromagnetic drive unit configured to have a magnet and a coil provided in portions that are mutually opposed in the movable member and the fixed member,
wherein the magnet and the coil are disposed with inclination from a direction perpendicular to an optical axis so that a direction of drive force that is generated when the coil is energized approximately conforms to a tangential direction of a spherical surface centering on the rotational center point.

2. An image shake correcting apparatus provided with a plurality of movable members and a fixed member, and that corrects image shake by rotating a movable member configured to hold a correcting member relative to the fixed member centering on a first rotational axis and a second rotational axis that intersect at a rotational center point, the image shake correcting apparatus comprising:
a first movable member supported in a rotatable state relative to the fixed member centering on the first rotational axis;
a second movable member configured to hold the correcting member, and that is supported by the first movable member in a state of rotatable centering on the second rotational axis;
a first electromagnetic drive unit configured to have a magnet and a coil provided in portions that are mutually opposed in the first movable number and the fixed member; and
a second electromagnetic drive unit configured to have a magnet and a coil provided in portions that are mutually opposed in the first movable member and the second movable member, and that is disposed on a periphery of the correcting member in a direction perpendicular to an optical axis of the correcting member,
wherein the magnet and the coil are disposed with inclination from a direction perpendicular to an optical axis so that a direction of drive force generated when the coil is energized approximately conforms to a tangential direction of a spherical surface centering on the rotational center point.

3. The image shake correcting apparatus according to claim 1, wherein the mutually opposed portions of the magnet and the coil are not spherical surfaces centering on the rotational center point.

4. The image shake correcting apparatus according to claim 2, wherein the mutually opposed portions of the magnet and the coil are not spherical surfaces centering on the rotational center point.

5. The image shake correcting apparatus according to claim 1, wherein, in a cross-section including an optical axis of the correcting member and a geometric center of the magnet or the coil that are in mutual opposition, a normal line at the geometric center of an opposed surface of the magnet or the coil is inclined relative to the optical axis, and the rotational center point and the intersection of the normal line and the optical axis are positioned on the same side relative to the correcting member.

6. The image shake correcting apparatus according to claim 5, wherein a planar portion is provided at an opposed surface of the coil that faces the magnet or an opposed surface of the magnet that faces the coil, and a foot of a perpendicular line which descends from the rotational center point to the planar surface portion is positioned within a circle whose radius is a distance from a geometric center of the planar portion to the optical axis.

7. The image shake correcting apparatus according to claim 6, wherein the foot of the perpendicular line which descends from the rotational center point to the planar portion is positioned in an opposed surface of the magnet or the coil.

8. The image shake correcting apparatus according to claim 6, which satisfies a relationship of $$A \tan (R2/L3) < \theta < A \tan (R3/L2)$$

when, among points of intersection of the correcting member and the optical axis, what is closer to the rotational center point is designated as a point C1, and what is farther from the rotational center point is designated as a point C2, a distance from the rotational center point to point C1 is designated as L2, a distance from the rotational center point to point C2 is designated as L3, a radius of the correcting member is designated as R2, a radius of the outermost periphery of the movable member that holds the correcting member is designated as R3, an angle constituted by a normal line of the planar surface portion against the optical axis is designated as θ, and an arctangent function is designated as Atan.

9. The image shake correcting apparatus according to claim 7, which satisfies a relationship of $$A \tan (R2/L3) < \theta < A \tan (R3/L2)$$

when, among points of intersection of the correcting member and the optical axis, what is closer to the rotational center point is designated as a point C1, and what is farther from the rotational center point is designated as a point C2, a distance from the rotational center point to point C1 is designated as L2, a distance from the rotational center point to point C2 is designated as L3, a radius of the correcting member is designated as R2, a radius of the outermost periphery of the movable member that holds the correcting member is designated as R3, an angle constituted by a normal line of the planar surface portion against the optical axis is designated as θ, and an arctangent function is designated as Atan.

10. The image shake correcting apparatus according to claim 6, wherein, in a cross-section including the optical axis and a geometric center of the planar surface portion, a normal line that passes through the pertinent geometric center passes through the rotational center point.

11. The image shake correcting apparatus according to claim 6, further comprising a magnetic detection unit configured to detect magnetism of the magnet,
wherein the magnetic detection unit opposes the magnet or the coil, and is disposed on the perpendicular line that descends from the rotational center point to the planar surface portion in a state where the movable member is positioned at a center of a range of mobility.

12. The image shake correcting apparatus according to claim 5, wherein a cylindrical portion is provided at an opposed surface of the coil that faces the magnet or an opposed surface of the magnet that faces the coil.

13. The image shake correcting apparatus according to claim 12, wherein a central axis of rotation of the cylindrical surface portion passes through the rotational center point.

14. The image shake correcting apparatus according to claim 12, wherein a central axis of rotation of the cylindrical surface portion is parallel or perpendicular to the drive direction of the electromagnetic drive unit.

15. The image shake correcting apparatus according to claim 13, wherein a central axis of rotation of the cylindrical surface portion is parallel or perpendicular to the drive direction of the electromagnetic drive unit.

16. The image shake correcting apparatus according to claim 12, wherein, among opposed surfaces of the magnet and the coil, a radius of curvature of an opposed surface that is closer to the rotational center point is smaller than a radius of curvature of an opposed surface that is farther from the rotational center point.

17. The image shake correcting apparatus according to claim 16, wherein the magnet is disposed at a position closer to the rotational center point than is the opposing coil.

18. The image shake correcting apparatus according to claim 12, further comprising a magnetic detection unit which detects magnetism of the magnet,
wherein the magnetic detection unit opposes the magnet or the coil, and is disposed on a perpendicular line that descends from the rotational center point to the cylindrical surface portion in a state where the movable member is positioned at a center of a range of mobility.

19. Optical equipment provided with the image shake correcting apparatus according to claim 1.

20. An imaging device provided with the image shake correcting apparatus according to claim 1.

* * * * *